United States Patent
Muratani

(10) Patent No.: US 12,449,645 B2
(45) Date of Patent: Oct. 21, 2025

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Mami Muratani, Tokyo (JP)

(73) Assignee: Nikon Corporation, Tokyo (JP)

(*) Notice: Subject to any disclaimer, the term of this patent is extended or adjusted under 35 U.S.C. 154(b) by 407 days.

(21) Appl. No.: 17/788,288

(22) PCT Filed: Dec. 2, 2020

(86) PCT No.: PCT/JP2020/044760
§ 371 (c)(1),
(2) Date: Jun. 22, 2022

(87) PCT Pub. No.: WO2021/140790
PCT Pub. Date: Jul. 15, 2021

(65) Prior Publication Data
US 2023/0048508 A1 Feb. 16, 2023

(30) Foreign Application Priority Data
Jan. 8, 2020 (JP) ................................. 2020-001436

(51) Int. Cl.
*G02B 15/14* (2006.01)
*G02B 15/20* (2006.01)
*G02B 27/00* (2006.01)

(52) U.S. Cl.
CPC ......... *G02B 15/1461* (2019.08); *G02B 15/20* (2013.01); *G02B 27/0025* (2013.01)

(58) Field of Classification Search
CPC ...... G02B 15/20; G02B 15/22; G02B 15/142; G02B 15/1421; G02B 15/1425; G02B 15/1461
(Continued)

(56) References Cited

U.S. PATENT DOCUMENTS

2006/0268428 A1   11/2006  Kuroda et al.
2014/0139722 A1*   5/2014  Sugita ............ G02B 15/145113
                                                        359/684
(Continued)

FOREIGN PATENT DOCUMENTS

JP   H11-072705 A    3/1999
JP   2006-301474 A   11/2006
(Continued)

OTHER PUBLICATIONS

International Preliminary Report on Patentability from International Patent Application No. PCT/JP2020/044760, Jul. 21, 2022.
(Continued)

*Primary Examiner* — Bumsuk Won
*Assistant Examiner* — Seth D Moser
(74) *Attorney, Agent, or Firm* — Potomac Law Group, PLLC

(57) ABSTRACT

A variable magnification optical system (ZL) comprises a front group (GA) and a rear group (GB). The rear group (GB) has a first focusing lens group (GF1) and a second focusing lens group (GF2). From focusing on an object at infinity to focusing on a short-distance object, the front group (GA) is fixed with respect to an image surface, and the first focusing lens group (GF1) and the second focusing lens group (GF2) move on different trajectories along an optical axis. The variable magnification system satisfies the following conditional expressions.

$$0.25 < \beta F1t/\beta F1w < 2.00$$

$$0.25 < \beta F2w/\beta F2t < 2.00$$

where βF1t is the magnification of the first focusing lens group (GF1) in a telephoto end state, βF1w is the magnification of the first focusing lens group (GF1) in a wide-angle end state, βF2t is the magnification of the
(Continued)

second focusing lens group (GF2) in the telephoto end state, and βF2w is the magnification of the second focusing lens group (GF2) in the wide-angle end state.

21 Claims, 17 Drawing Sheets

(58) Field of Classification Search
USPC .......................................................... 359/676
See application file for complete search history.

(56) References Cited

U.S. PATENT DOCUMENTS

| | | |
|---|---|---|
| 2014/0218808 A1 | 8/2014 | Ogata et al. |
| 2014/0240554 A1 | 8/2014 | Uchida et al. |
| 2015/0168697 A1 | 6/2015 | Ogata |
| 2016/0091692 A1 | 3/2016 | Hirano |
| 2016/0116721 A1 | 4/2016 | Ogata et al. |
| 2016/0209632 A1* | 7/2016 | Imaoka ............... G02B 15/1465 |
| 2017/0108677 A1* | 4/2017 | Shimomura ........... G02B 15/20 |
| 2017/0192212 A1 | 7/2017 | Yamamoto |
| 2019/0025560 A1* | 1/2019 | Okuoka ............. G02B 15/1461 |
| 2019/0187409 A1* | 6/2019 | Noda .................. G02B 27/0025 |
| 2019/0317335 A1 | 10/2019 | Kawamura |

FOREIGN PATENT DOCUMENTS

| | | |
|---|---|---|
| JP | 2011-209347 A | 10/2011 |
| JP | 2013-235218 A | 11/2013 |
| JP | 2014-102462 A | 6/2014 |
| JP | 2014-153402 A | 8/2014 |
| JP | 2014-186306 A | 10/2014 |
| JP | WO 2014/196022 A1 | 12/2014 |
| JP | 2015-118127 A | 6/2015 |
| JP | 2015-197655 A | 11/2015 |
| JP | 2016-139125 A | 8/2016 |
| JP | 2017-129668 A | 7/2017 |
| JP | 2019-139251 A | 8/2019 |
| JP | 2019-184968 A | 10/2019 |
| JP | 2019-219595 A | 12/2019 |
| JP | 2020-034681 A | 3/2020 |

OTHER PUBLICATIONS

Office Action issued Sep. 21, 2023, in Japanese Patent Application No. 2021-569762.
Office Action issued May 30, 2023, in Japanese Patent Application No. 2021-569762.
International Search Report from International Patent Application No. PCT/JP2020/044760, Feb. 22, 2021.
Office Action issued Mar. 27, 2023, in Chinese Patent Application No. 202080087988.3.
Office Action issued Mar. 4, 2025, in Japanese Patent Application No. 2024-012370.

* cited by examiner

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus and a method for manufacturing the zoom optical system.

TECHNICAL BACKGROUND

Conventionally, zoom optical systems suitable for photographic cameras, electronic still cameras, video cameras and the like have been proposed (for example, see Patent literature 1). These zoom optical systems are required to reduce variation in angle of view upon focusing.

PRIOR ARTS LIST

Patent Document

Patent literature 1: International Patent publication No. WO2014/196022

SUMMARY OF THE INVENTION

A zoom optical system according to a first aspect of the present invention consists of, in order from an object along an optical axis: a front group; and a rear group, wherein the rear group includes: a first focusing lens group disposed closest to the object in the rear group; and a second focusing lens group disposed closer to an image surface than the first focusing lens group, upon zooming, a distance between the lens groups adjacent to each other changes, and upon focusing from an infinity object to a short distance object, the front group is fixed with respect to the image surface, and the first focusing lens group and the second focusing lens group move along the optical axis, respectively on trajectories different from each other, the following conditional expressions are satisfied, $$0.25 < \beta F1t/\beta F1w < 2.00$$

$$0.25 < \beta F2w/\beta F2t < 2.00$$

where βF1t: a magnification of the first focusing lens group upon focusing on infinity in a telephoto end state, βF1w: a magnification of the first focusing lens group upon focusing on infinity in a wide angle end state, βF2t: a magnification of the second focusing lens group upon focusing on infinity in the telephoto end state, and βF2w: a magnification of the second focusing lens group upon focusing on infinity in the wide angle end state.

A zoom optical system according to a second aspect of the present invention consists of, in order from an object along the optical axis: a front group; and a rear group, wherein the rear group includes a focusing lens group that is disposed closest to the object in the rear group, and moves along the optical axis upon focusing, upon zooming, a distance between lens groups adjacent to each other changes, and the following conditional expression is satisfied, $$0.35 < fF2/fBF2w < 0.75$$

where fF2: a focal length of the focusing lens group; in a case where the rear group includes a plurality of focusing lens groups including the focusing lens group, a focal length of a focusing lens group disposed closest to an image surface among the plurality of focusing lens groups, and fBF2w: a combined focal length of lens groups from the focusing lens group to the lens group closest to the image surface in the wide angle end state; in the case where the rear group includes the plurality of focusing lens groups including the focusing lens group, a combined focal length of lens groups that are from the focusing lens group disposed closest to the image surface among the plurality of focusing lens groups to a lens group closest to the image surface.

An optical apparatus according to the present invention comprises the zoom optical system described above.

A method according to the present invention for manufacturing a zoom optical system consisting of, in order from an object along an optical axis, a front group; and a rear group, comprising a step of disposing the front group and the rear group in a lens barrel so that;

the rear group includes: a first focusing lens group disposed closest to the object in the rear group; and a second focusing lens group disposed closer to an image surface than the first focusing lens group, upon zooming, a distance between the lens groups adjacent to each other changes, and upon focusing from an infinity object to a short distance object, the front group is fixed with respect to the image surface, and the first focusing lens group and the second focusing lens group move along the optical axis, respectively on trajectories different from each other, the following conditional expressions are satisfied, $$0.25 < \beta F1t/\beta F1w < 2.00$$

$$0.25 < \beta F2w/\beta F2t < 2.00$$

where βF1t: a magnification of the first focusing lens group upon focusing on infinity in a telephoto end state, βF1w: a magnification of the first focusing lens group upon focusing on infinity in a wide angle end state, βF2t: a magnification of the second focusing lens group upon focusing on infinity in the telephoto end state, and βF2w: a magnification of the second focusing lens group upon focusing on infinity in the wide angle end state.

DESCRIPTION OF THE EMBODIMENTS

Figure 16:
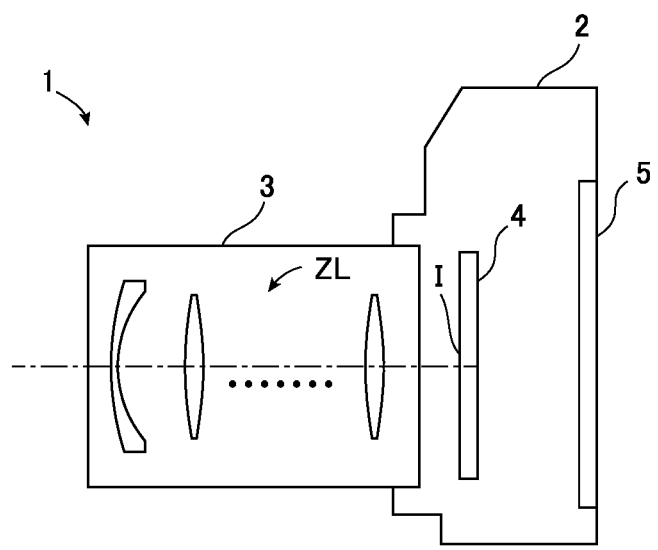
FIG. 16 shows a configuration of a camera that includes the zoom optical system according to each embodiment.

Hereinafter, preferable embodiments according to the present invention are described. First, a camera (optical apparatus) that includes a zoom optical system according to each embodiment is described with reference to FIG. 16. As shown in FIG. 16, this camera 1 includes a main body 2, and a photographing lens 3 mounted on the main body 2. The main body 2 includes an imaging element 4, a main body control part (not shown) that controls the operation of a digital camera, and a liquid crystal screen 5. The photographing lens 3 includes a zoom optical system ZL that consists of a plurality of lens groups, and a lens position control mechanism (not shown) that controls the position of each lens group. The lens position control mechanism includes a sensor that detects the position of each lens group, a motor that moves each lens group back and forth along the optical axis, and a control circuit that drives the motor.

Light from a photographic subject is condensed by the zoom optical system ZL of the photographing lens 3, and reaches an image surface I of the imaging element 4. The light having reached the image surface I photoelectrically converted by the imaging element 4, and is recorded as digital image data in a memory, not shown. The digital image data recorded in the memory is allowed to be displayed on the liquid crystal screen 5 according to an operation by a user. Note that this camera may be a mirrorless camera, or a single-lens reflex camera that includes a quick return mirror.

Figure 1:
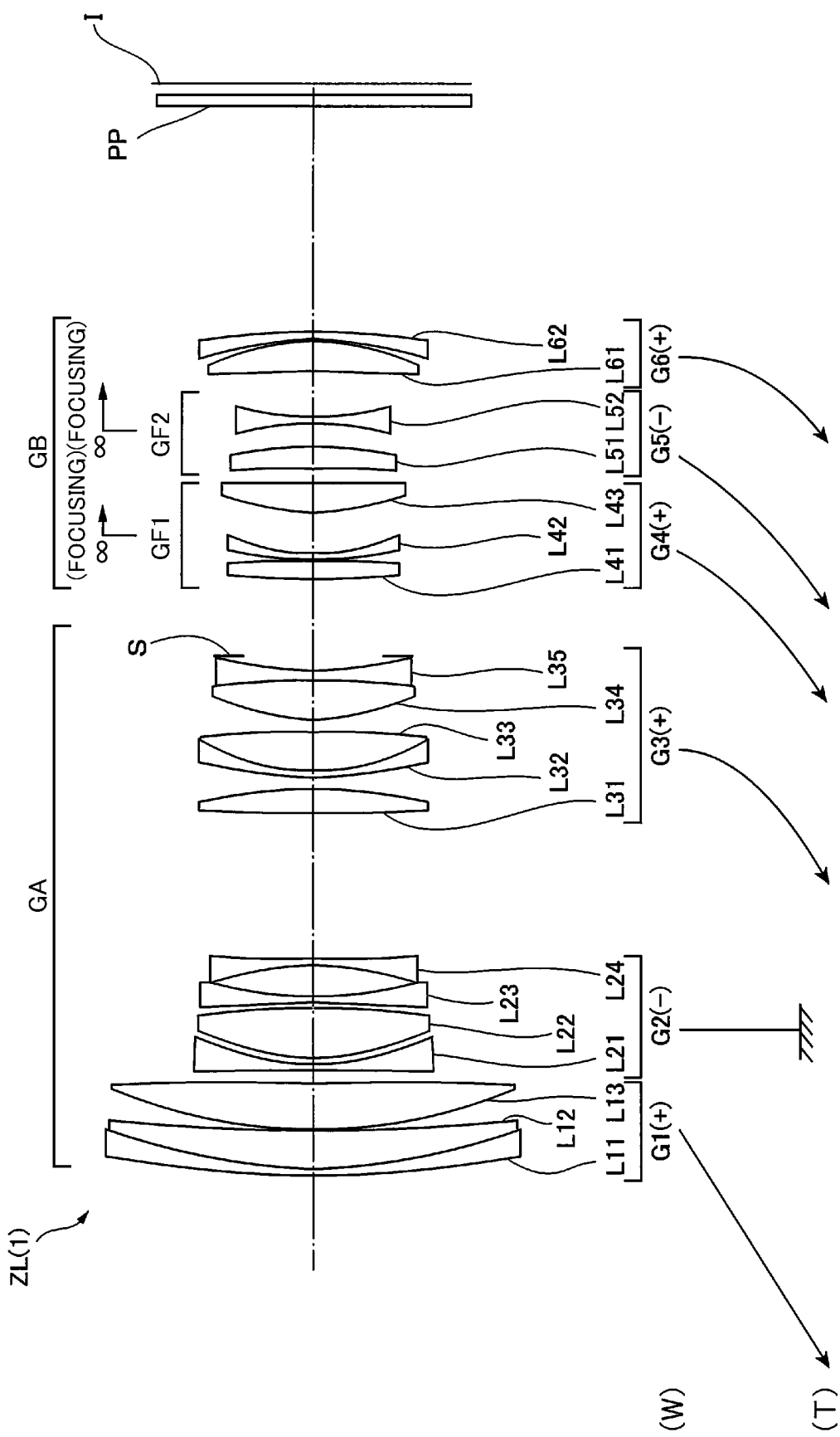
FIG. 1 shows a lens configuration of a zoom optical system according to First Example.

Next, a zoom optical system according to a first embodiment is described. As shown in FIG. 1, a zoom optical system ZL(1) that is an example of the zoom optical system (zoom lens) ZL according to the first embodiment consists of, in order from an object along an optical axis: a front group GA; and a rear group GB. The rear group GB includes: a first focusing lens group GF1 disposed closest to the object in the rear group GB; and a second focusing lens group GF2 disposed closer to an image surface than the first focusing lens group GF1. Upon zooming, the distance between lens groups adjacent to each other changes. Upon focusing from an infinity object to a short distance object, the front group GA is fixed with respect to the image surface, and the first focusing lens group GF1 and the second focusing lens group GF2 move along the optical axis, respectively on trajectories different from each other. Preferably, the first focusing lens group GF1 has a positive refractive power. Preferably, the second focusing lens group GF2 has a negative refractive power. Preferably, the first focusing lens group GF1 moves toward the image surface upon focusing from the infinity object to the short distance object. Preferably, the second focusing lens group GF2 moves toward the image surface upon focusing from the infinity object to the short distance object.

With the configuration described above, the zoom optical system ZL according to the first embodiment satisfies the following conditional expression (1) and conditional expression (2).

$$0.25 < \beta F1t/\beta F1w < 2.00 \quad (1)$$

$$0.25 < \beta F2w/\beta F2t < 2.00 \quad (2)$$

where $\beta F1t$: the magnification of the first focusing lens group GF1 upon focusing on infinity in a telephoto end state, $\beta F1w$: the magnification of the first focusing lens group GF1 upon focusing on infinity in a wide angle end state, $\beta F2t$: the magnification of the second focusing lens group GF2 upon focusing on infinity in the telephoto end state, and $\beta F2w$: the magnification of the second focusing lens group GF2 upon focusing on infinity in the wide angle end state.

According to the first embodiment, the zoom optical system having a small variation in angle of view upon focusing, and the optical apparatus including this zoom optical system can be achieved. The zoom optical system ZL according to the first embodiment may be a zoom optical system ZL(2) shown in FIG. 4, a zoom optical system ZL(3) shown in FIG. 7, or a zoom optical system ZL(4) shown in FIG. 10.

The conditional expression (1) defines an appropriate relationship between the magnification of the first focusing lens group GF1 upon focusing on infinity in the telephoto end state, and the magnification of the first focusing lens group GF1 upon focusing on infinity in the wide angle end state. The conditional expression (2) defines an appropriate relationship between the magnification of the second focusing lens group GF2 upon focusing on infinity in the telephoto end state, and the magnification of the second focusing lens group GF2 upon focusing on infinity in the wide angle end state.

By satisfying the conditional expression (1) and the conditional expression (2), the change in magnification between the first focusing lens group GF1 and the second focusing lens group GF2 upon focusing are cancelled out, which can reduce the change in angle of view upon focusing.

If the corresponding value of the conditional expression (1) goes out of the range, it becomes difficult to suppress variation in angle of view upon focusing. By setting the lower limit value of the conditional expression (1) to 0.30, 0.40, 0.50, 0.55, 0.60, 0.65, 0.68, 0.70, or further to 0.73, the advantageous effects of this embodiment can be further secured. By setting the upper limit value of the conditional expression (1) to 1.85, 1.70, 1.60, 1.50, 1.40, 1.35, 1.30, 1.25, 1.20, or further to 1.18, the advantageous effects of this embodiment can be further secured.

If the corresponding value of the conditional expression (2) goes out of the range, it becomes difficult to suppress variation in angle of view upon focusing. By setting the lower limit value of the conditional expression (2) to 0.30, 0.35, 0.40, 0.45, 0.50, 0.55, 0.60, 0.65, 0.70, 0.75, or further to 0.80, the advantageous effects of this embodiment can be further secured. By setting the upper limit value of the conditional expression (2) to 1.98, 1.95, 1.93, 1.90, 1.88, 1.85, 1.80, 1.70, 1.60, 1.50, 1.40, 1.35, or further to 1.30, the advantageous effects of this embodiment can be further secured.

Preferably, the zoom optical system ZL according to the first embodiment satisfies the following conditional expression (3).

$$0.01 < \beta F1w/\beta F2w < 0.25 \qquad (3)$$

The conditional expression (3) defines an appropriate relationship between the magnification of the first focusing lens group GF1 upon focusing on infinity in the wide angle end state, and the magnification of the second focusing lens group GF2 upon focusing on infinity in the wide angle end state. By satisfying the conditional expression (3), the variation in angle of view upon focusing can be reduced.

If the corresponding value of the conditional expression (3) goes out of the range, it becomes difficult to suppress variation in angle of view upon focusing. By setting the lower limit value of the conditional expression (3) to 0.02, 0.03, or further to 0.04, the advantageous effects of this embodiment can be further secured. By setting the upper limit value of the conditional expression (3) to 0.23, 0.20, 0.19, 0.18, or further to 0.17, the advantageous effects of this embodiment can be further secured.

Preferably, the zoom optical system ZL according to the first embodiment satisfies the following conditional expression (4).

$$0.10 < \Delta X1w/\Delta X2w < 0.75 \qquad (4)$$

where $\Delta X1w$: the amount of movement of the first focusing lens group GF1 upon focusing from the infinity object to a very short distance object in the wide angle end state, and $\Delta X2w$: the amount of movement of the second focusing lens group GF2 upon focusing from the infinity object to the very short distance object in the wide angle end state.

The conditional expression (4) defines an appropriate relationship between the amount of movement of the first focusing lens group GF1 upon focusing from the infinity object to the very short distance object in the wide angle end state, and the amount of movement of the second focusing lens group GF2 upon focusing from the infinity object to the very short distance object in the wide angle end state. By satisfying the conditional expression (4), the variation in angle of view upon focusing can be reduced.

If the corresponding value of the conditional expression (4) goes out of the range, it becomes difficult to suppress variation in angle of view upon focusing. By setting the lower limit value of the conditional expression (4) to 0.12, 0.14, 0.15, 0.20, 0.23, 0.25, 0.30, 0.35, or further to 0.40, the advantageous effects of this embodiment can be further secured. By setting the upper limit value of the conditional expression (4) to 0.73, 0.70, 0.68, 0.65, 0.63, or further to 0.62, the advantageous effects of this embodiment can be further secured.

Preferably, the zoom optical system ZL according to the first embodiment satisfies the following conditional expression (5).

$$0.001 < 1/fAt < 0.020 \qquad (5)$$

where fAt: a focal length of the front group GA in the telephoto end state.

The conditional expression (5) defines an appropriate range of the focal length of the front group GA in the telephoto end state. By satisfying the conditional expression (5), the variation in angle of view upon focusing can be reduced.

If the corresponding value of the conditional expression (5) goes out of the range, it becomes difficult to suppress variation in angle of view upon focusing. By setting the lower limit value of the conditional expression (5) to 0.002, or further to 0.003, the advantageous effects of this embodiment can be further secured. By setting the upper limit value of the conditional expression (5) to 0.018, 0.015, 0.013, or further to 0.010, the advantageous effects of this embodiment can be further secured.

Preferably, the zoom optical system ZL according to the first embodiment satisfies the following conditional expression (6).

$$0.001 < 1/fAF2w < 0.015 \qquad (6)$$

where fAF2w: the combined focal length of lens groups that are from a lens group closest to the object to the second focusing lens group GF2 in the wide angle end state.

The conditional expression (6) defines an appropriate range of the combined focal length of lens groups that are from the lens group closest to the object to the second focusing lens group GF2 in the wide angle end state. By satisfying the conditional expression (6), the variation in angle of view upon focusing can be reduced.

If the corresponding value of the conditional expression (6) goes out of the range, it becomes difficult to suppress variation in angle of view upon focusing. By setting the lower limit value of the conditional expression (6) to 0.002, the advantageous effects of this embodiment can be further secured. By setting the upper limit value of the conditional expression (6) to 0.013, 0.010, 0.008, or further to 0.006, the advantageous effects of this embodiment can be further secured.

In the zoom optical system ZL according to the first embodiment, preferably, the second focusing lens group GF2 includes, in order from the object along the optical axis: one positive lens; and one negative lens. Accordingly, variation in various aberrations, such as chromatic aberrations, upon focusing can be reduced.

Preferably, the zoom optical system ZL according to the first embodiment satisfies the following conditional expression (7)

$$0.35 < fF2/fBF2w < 0.75 \qquad (7)$$

where fF2: the focal length of the second focusing lens group GF2, and fBF2w: the combined focal length of lens groups from the second focusing lens group GF2 to a lens group closest to the image surface in the wide angle end state.

The conditional expression (7) defines an appropriate relationship between the focal length of the second focusing lens group GF2, and the combined focal length of lens groups that are from the second focusing lens group GF2 to the lens group closest to the image surface in the wide angle end state. By satisfying the conditional expression (7), the variation in angle of view upon focusing can be reduced.

If the corresponding value of the conditional expression (7) goes out of the range, it becomes difficult to suppress variation in angle of view upon focusing. By setting the lower limit value of the conditional expression (7) to 0.36, 0.38, 0.40, 0.42, 0.45, 0.48, 0.50, 0.54, or further to 0.55, the advantageous effects of this embodiment can be further secured. By setting the upper limit value of the conditional expression (7) to 0.73, or further to 0.70, the advantageous effects of this embodiment can be further secured.

Preferably, the zoom optical system ZL according to the first embodiment satisfies the following conditional expression (8)

$$-2.00 < fBF2w/fBrw < -0.15 \quad (8)$$

where fBF2w: the combined focal length of lens groups from the second focusing lens group GF2 to a lens group closest to the image surface in the wide angle end state, and fBrw: the combined focal length of lens groups disposed closer to the image surface than the second focusing lens group GF2 in the wide angle end state.

The conditional expression (8) defines an appropriate relationship between the combined focal length of lens groups that are from the second focusing lens group GF2 to the lens group closest to the image surface in the wide angle end state, and the combined focal length of lens groups disposed closer to the image surface than the second focusing lens group GF2 in the wide angle end state. By satisfying the conditional expression (8), the variation in angle of view upon focusing can be reduced.

If the corresponding value of the conditional expression (8) goes out of the range, it becomes difficult to suppress variation in angle of view upon focusing. By setting the lower limit value of the conditional expression (8) to −1.90, −1.80, −1.70, −1.65, −1.35, −1.20, −1.10, or further to −1.05, the advantageous effects of this embodiment can be further secured. By setting the upper limit value of the conditional expression (8) to −0.20, −0.25, −0.30, −0.35, −0.40, −0.45, −0.50, −0.55, or further to −0.58, the advantageous effects of this embodiment can be further secured.

Preferably, the zoom optical system ZL according to the first embodiment satisfies the following conditional expression (9).

$$0.10 < \beta BF2w/\beta F2w < 0.80 \quad (9)$$

where βBF2w: the combined magnification of lens groups from the second focusing lens group GF2 to a lens group closest to the image surface in the wide angle end state.

The conditional expression (9) defines an appropriate relationship between the combined magnification of lens groups that are from the second focusing lens group GF2 to the lens group closest to the image surface in the wide angle end state, and the magnification of the second focusing lens group GF2 in the wide angle end state. By satisfying the conditional expression (9), the variation in angle of view upon focusing can be reduced.

If the corresponding value of the conditional expression (9) goes out of the range, it becomes difficult to suppress variation in angle of view upon focusing. By setting the lower limit value of the conditional expression (9) to 0.13, 0.15, 0.18, 0.20, or further to 0.23, the advantageous effects of this embodiment can be further secured. By setting the upper limit value of the conditional expression (9) to 0.78, 0.75, 0.73, or further to 0.70, the advantageous effects of this embodiment can be further secured.

Preferably, the zoom optical system ZL according to the first embodiment satisfies the following conditional expression (10).

$$0.05 < \beta Brw/\beta BF2w < 0.50 \quad (10)$$

where βBrw: the combined magnification of lens groups disposed closer to the image surface than the second focusing lens group GF2 in the wide angle end state, and βBF2w: the combined magnification of lens groups from the second focusing lens group GF2 to a lens group closest to the image surface in the wide angle end state.

The conditional expression (10) defines an appropriate relationship between the combined magnification of lens groups disposed closer to the image surface than the second focusing lens group GF2 in the wide angle end state, and the combined magnification of lens groups that are from the second focusing lens group GF2 to the lens group closest to the image surface in the wide angle end state. By satisfying the conditional expression (10), the variation in angle of view upon focusing can be reduced.

If the corresponding value of the conditional expression (10) goes out of the range, it becomes difficult to suppress variation in angle of view upon focusing. By setting the lower limit value of the conditional expression (10) to 0.06, 0.08, 0.10, or further to 0.12, the advantageous effects of this embodiment can be further secured. By setting the upper limit value of the conditional expression (10) to 0.48, 0.45, 0.43, 0.41, or further to 0.40, the advantageous effects of this embodiment can be further secured.

Next, the zoom optical system according to a second embodiment is described. As shown in FIG. 1, a zoom optical system ZL(1) that is an example of the zoom optical system (zoom lens) ZL according to the second embodiment consists of, in order from an object along an optical axis: a front group GA; and a rear group GB. The rear group GB includes a focusing lens group that is disposed closest to the object in the rear group GB and moves along the optical axis upon focusing. Upon zooming, the distance between lens groups adjacent to each other changes.

With the configuration described above, the zoom optical system ZL according to the second embodiment satisfies the following conditional expression (11).

$$0.35 < fF2/fBF2w < 0.75 \quad (11)$$

where fF2: a focal length of the focusing lens group; in a case where the rear group GB includes a plurality of focusing lens groups including the focusing lens group, a focal length of a focusing lens group disposed closest to an image surface among the plurality of focusing lens groups, and fBF2w: a combined focal length of lens groups from the focusing lens group to the lens group closest to the image surface in the wide angle end state; in the case where the rear group GB includes the plurality of focusing lens groups including the focusing lens group, a combined focal length of lens groups that are from the focusing lens group disposed closest to the image surface among the plurality of focusing lens groups to a lens group closest to the image surface.

According to the second embodiment, the zoom optical system having a small variation in angle of view upon focusing, and the optical apparatus including this zoom optical system can be achieved. The zoom optical system ZL according to the second embodiment may be a zoom optical system ZL(2) shown in FIG. 4, a zoom optical system ZL(3) shown in FIG. 7, a zoom optical system ZL(4) shown in FIG. 10, or a zoom optical system ZL(5) shown in FIG. 13.

The conditional expression (11) defines an appropriate relationship between the focal length of the focusing lens group, and the combined focal length of lens groups that are from the focusing lens group to the lens group closest to the image surface in the wide angle end state. By satisfying the conditional expression (11), the variation in angle of view upon focusing can be reduced.

If the corresponding value of the conditional expression (11) goes out of the range, it becomes difficult to suppress variation in angle of view upon focusing. By setting the lower limit value of the conditional expression (11) to 0.36, 0.38, 0.40, 0.42, 0.45, 0.48, 0.50, 0.54, or further to 0.55, the advantageous effects of this embodiment can be further secured. By setting the upper limit value of the conditional expression (11) to 0.73, or further to 0.70, the advantageous effects of this embodiment can be further secured.

Preferably, the zoom optical system ZL according to the second embodiment satisfies the following conditional expression (12).

$$-2.00 < fBF2w/fBrw < -0.15 \quad (12)$$

where fBrw: a combined focal length of lens groups disposed closer to the image surface than the focusing lens group in the wide angle end state; in the case where the rear group GB includes the plurality of focusing lens groups including the focusing lens group, a combined focal length of lens groups disposed closer to the image surface than the focusing lens group disposed closest to the image surface among the plurality of focusing lens groups.

The conditional expression (12) defines an appropriate relationship between the combined focal length of lens groups that are from the focusing lens group to the lens group closest to the image surface in the wide angle end state, and the combined focal length of lens groups disposed closer to the image surface than the focusing lens group in the wide angle end state. By satisfying the conditional expression (12), the variation in angle of view upon focusing can be reduced.

If the corresponding value of the conditional expression (12) goes out of the range, it becomes difficult to suppress variation in angle of view upon focusing. By setting the lower limit value of the conditional expression (12) to −1.90, −1.80, −1.70, −1.65, −1.35, −1.20, −1.10, or further to −1.05, the advantageous effects of this embodiment can be further secured. By setting the upper limit value of the conditional expression (12) to −0.20, −0.30, −0.35, −0.40, −0.45, −0.50, −0.55, or further to −0.58, the advantageous effects of this embodiment can be further secured.

Preferably, the zoom optical system ZL according to the second embodiment satisfies the following conditional expression (13).

$$0.10 < \beta BF2w/\beta F2w < 0.80 \quad (13)$$

where βBF2w: a combined magnification of the lens groups from the focusing lens group to the lens group closest to the image surface in the wide angle end state; in the case where the rear group GB includes the plurality of focusing lens groups including the focusing lens group, a combined magnification of the lens groups that are from the focusing lens group disposed closest to the image surface among the plurality of focusing lens groups to the lens group closest to the image surface, and βF2w: a magnification of the focusing lens group in the wide angle end state; in the case where the rear group GB includes the plurality of focusing lens groups including the focusing lens group, a magnification of the focusing lens group disposed closest to the image surface among the plurality of focusing lens groups.

The conditional expression (13) defines an appropriate relationship between the combined magnification of lens groups that are from the focusing lens group to the lens group closest to the image surface in the wide angle end state, and the magnification of the focusing lens group in the wide angle end state. By satisfying the conditional expression (13), the variation in angle of view upon focusing can be reduced.

If the corresponding value of the conditional expression (13) goes out of the range, it becomes difficult to suppress variation in angle of view upon focusing. By setting the lower limit value of the conditional expression (13) to 0.13, 0.15, 0.18, 0.20, or further to 0.23, the advantageous effects of this embodiment can be further secured. By setting the upper limit value of the conditional expression (13) to 0.78, 0.75, 0.73, or further to 0.70, the advantageous effects of this embodiment can be further secured.

Preferably, the zoom optical system ZL according to the second embodiment satisfies the following conditional expression (14).

$$0.05 < \beta Brw/\beta BF2w < 0.50 \quad (14)$$

where βBrw: a combined magnification of lens groups disposed closer to the image surface than the focusing lens group in the wide angle end state; in a case where the rear group GB includes the plurality of focusing lens groups including the focusing lens group, a combined magnification of lens groups disposed closer to the image surface than the focusing lens group disposed closest to the image surface among the plurality of focusing lens groups, and βBF2w: a combined magnification of the lens groups from the focusing lens group to the lens group closest to the image surface in the wide angle end state; in the case where the rear group GB includes the plurality of focusing lens groups including the focusing lens group, a combined magnification of the lens groups that are from the focusing lens group disposed closest to the image surface among the plurality of focusing lens groups to the lens group closest to the image surface.

The conditional expression (14) defines an appropriate relationship between the combined magnification of lens groups disposed closer to the image surface than the focusing lens group in the wide angle end state, and the combined magnification of lens groups that are from the focusing lens group to the lens group closest to the image surface in the wide angle end state. By satisfying the conditional expression (14), the variation in angle of view upon focusing can be reduced.

If the corresponding value of the conditional expression (14) goes out of the range, it becomes difficult to suppress variation in angle of view upon focusing. By setting the lower limit value of the conditional expression (14) to 0.06, 0.08, 0.10, or further to 0.12, the advantageous effects of this embodiment can be further secured. By setting the upper limit value of the conditional expression (14) to 0.48, 0.45, 0.43, 0.41, or further to 0.40, the advantageous effects of this embodiment can be further secured.

Preferably, the zoom optical system ZL according to the second embodiment satisfies the following conditional expression (15).

$$0.001 < 1/fAF2w < 0.015 \quad (15)$$

where fAF2w: a combined focal length of lens groups from a lens group closest to the object to the focusing lens group in the wide angle end state; in the case where the rear group GB includes the plurality of focusing lens groups including the focusing lens group, a combined focal length of lens groups that are from the lens group closest to the object to the focusing lens group disposed closest to the image surface among the plurality of focusing lens groups.

The conditional expression (15) defines an appropriate range of the combined focal length of lens groups that are from a lens group closest to the object to the focusing lens group in the wide angle end state. By satisfying the conditional expression (15), the variation in angle of view upon focusing can be reduced.

If the corresponding value of the conditional expression (15) goes out of the range, it becomes difficult to suppress variation in angle of view upon focusing. By setting the lower limit value of the conditional expression (15) to 0.002, the advantageous effects of this embodiment can be further secured. By setting the upper limit value of the conditional expression (15) to 0.013, 0.010, 0.008, or further to 0.006, the advantageous effects of this embodiment can be further secured.

Preferably, the zoom optical systems ZL according to the first embodiment and the second embodiment satisfy the following conditional expression (16).

$$0.15<(ftinf-ftmod)/ftinf<0.40 \tag{16}$$

where ftinf: a focal length of the zoom optical system ZL upon focusing on infinity in the telephoto end state, and ftmod: a focal length of the zoom optical system ZL upon focusing on a very short distance object in the telephoto end state.

The conditional expression (16) defines an appropriate relationship between the focal length of the zoom optical system ZL upon focusing on infinity in the telephoto end state, and the focal length of the zoom optical system ZL upon focusing on the very short distance object in the telephoto end state. By satisfying the conditional expression (16), the variation in angle of view upon focusing can be reduced.

If the corresponding value of the conditional expression (16) goes out of the range, it becomes difficult to suppress variation in angle of view upon focusing. By setting the lower limit value of the conditional expression (16) to 0.18, 0.20, 0.22, 0.24, 0.25, or further to 0.26, the advantageous effects of each embodiment can be further secured. By setting the upper limit value of the conditional expression (16) to 0.38, 0.36, 0.35, or further to 0.33, the advantageous effects of each embodiment can be further secured.

Preferably, the zoom optical systems ZL according to the first embodiment and the second embodiment include an aperture stop S, and satisfy the following conditional expression (17).

$$0.35<STw/TLw<0.65 \tag{17}$$

where STw: a distance on the optical axis from the aperture stop S to the image surface in the wide angle end state, and TLw: an entire length of the zoom optical system ZL in the wide angle end state.

The conditional expression (17) defines an appropriate relationship between the distance on the optical axis from the aperture stop S to the image surface in the wide angle end state, and the entire length of the zoom optical system ZL in the wide angle end state. By satisfying the conditional expression (17), the various aberrations, such as the distortion and the curvature of field, in the wide-angle end state can be favorably corrected.

If the corresponding value of the conditional expression (17) goes out of the range, it becomes difficult to correct various aberrations, such as the distortion and the curvature of field, in the wide angle end state. By setting the lower limit value of the conditional expression (17) to 0.33, 0.35, 0.38, 0.40, 0.43, 0.45, or further to 0.46, the advantageous effects of each embodiment can be further secured. By setting the upper limit value of the conditional expression (17) to 0.63, 0.60, 0.58, 0.56, or further to 0.55, the advantageous effects of each embodiment can be further secured.

Preferably, the zoom optical systems ZL according to the first embodiment and the second embodiment satisfy the following conditional expression (18).

$$0.04<Bft/TLt<0.35 \tag{18}$$

where Bft: the back focus of the zoom optical system ZL in the telephoto end state, and TLt: the entire length of the zoom optical system ZL in a telephoto end state.

The conditional expression (18) defines an appropriate relationship between the back focus of the zoom optical system ZL in the telephoto end state, and the entire length of the zoom optical system ZL in the telephoto end state. By satisfying the conditional expression (18), the various aberrations, such as the spherical aberration, in the telephoto end state can be favorably corrected.

If the corresponding value of the conditional expression (18) goes out of the range, it becomes difficult to correct various aberrations, such as the spherical aberration, in the telephoto end state. By setting the lower limit value of the conditional expression (18) to 0.05, 0.06, 0.08, 0.10, 0.13, 0.15, or further to 0.16, the advantageous effects of each embodiment can be further secured. By setting the upper limit value of the conditional expression (18) to 0.33, 0.30, or further to 0.28, the advantageous effects of each embodiment can be further secured.

Preferably, the zoom optical systems ZL according to the first embodiment and the second embodiment satisfy the following conditional expression (19).

$$0.25<Bfw/fw<0.70 \tag{19}$$

where Bfw: a back focus of the zoom optical system ZL in the wide angle end state, and fw: a focal length of the zoom optical system ZL in the wide angle end state.

The conditional expression (19) defines an appropriate relationship between the back focus of the zoom optical system ZL in the wide angle end state, and the focal length of the zoom optical system ZL in the wide angle end state. By satisfying the conditional expression (19), the various aberrations including the coma aberration in the wide-angle end state can be favorably corrected.

If the corresponding value of the conditional expression (19) goes out of the range, it becomes difficult to correct various aberrations including the coma aberration, in the wide angle end state. By setting the lower limit value of the conditional expression (19) to 0.28, 0.30, 0.33, 0.35, 0.38, 0.40, 0.43, 0.45, 0.48, or further to 0.50, the advantageous effects of each embodiment can be further secured. By setting the upper limit value of the conditional expression (19) to 0.68, 0.65, 0.63, 0.60, 0.58, or further to 0.55, the advantageous effects of each embodiment can be further secured.

Figure 17:
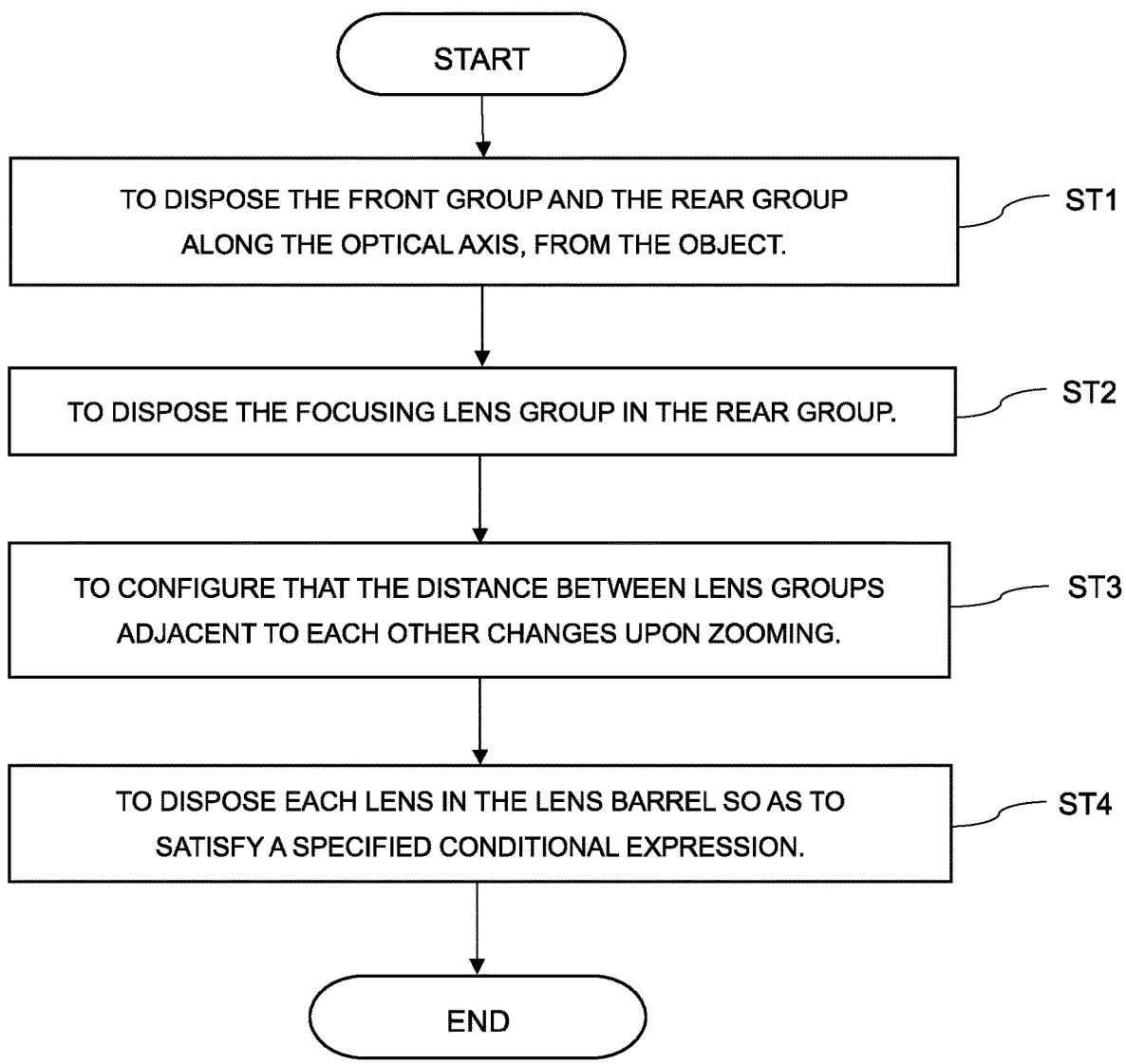
FIG. 17 is a flowchart showing a method for manufacturing the zoom optical system according to each embodiment.

Subsequently, referring to FIG. 17, a method for manufacturing the zoom optical system ZL according to the first embodiment is schematically described. First, along the optical axis, from the object, the front group GA and the rear group GB are disposed (step ST1). Next, the first focusing lens group GF1 is disposed closest to the object in the rear group GB, and the second focusing lens group GF2 is disposed closer to the image surface than the first focusing lens group GF1 (step ST2). Next, the configuration is made so that the distance between lens groups adjacent to each other changes upon zooming (step ST3). The configuration is made so that upon focusing from the infinity object to the short distance object, the front group GA is fixed with respect to the image surface, and the first focusing lens group GF1 and the second focusing lens group GF2 move along the optical axis, respectively on trajectories different from each other. Each lens is disposed in a lens barrel so as to satisfy at least the conditional expression (1) and the conditional expression (2) (step ST4). According to such a manufacturing method, a zoom optical system having a small variation in angle of view upon focusing can be manufactured. Subsequently, similar to the case of the first embodiment, referring to FIG. 17, a method for manufacturing the zoom optical system ZL according to the second embodiment is schematically described. First, along the optical axis, from the object, the front group GA and the rear group GB are disposed (step ST1). Next, the focusing lens group is disposed in the rear group GB so as to be closest to the object (step ST2). Next, the configuration is made so that the distance between lens groups adjacent to each other changes upon zooming (step ST3). The configuration is made so that upon focusing, the focusing lens group moves along the optical axis. Each lens is disposed in the lens barrel so as to satisfy at least the conditional expression (11) (step ST4). According to such a manufacturing method, a zoom optical system having a small variation in angle of view upon focusing can be manufactured.

EXAMPLES

Zoom optical systems ZL according to Examples of each embodiment are described with reference to the drawings. Note that Examples corresponding to the first embodiment are First to Fourth Examples, and Examples corresponding to the second embodiment are First to Fifth Examples. FIGS. 1, 4, 7, 10 and 13 are sectional views showing the configurations and refractive power allocations of zoom optical systems ZL {ZL(1) to ZL(5)}according to First to Fifth Examples. In the sectional views of the zoom optical systems ZL(1) to ZL(5) according to First to Fifth Examples, the moving direction upon focusing along the optical axis of the focusing group from the infinity to a short distance object is indicated by an arrow accompanied by characters "FOCUSING". In the sectional views of the zoom optical systems ZL(1) to ZL(5) according to First to Fifth Examples, the moving direction of each lens group along the optical axis upon zooming from the wide angle end state (W) to the telephoto end state (T) is indicated by an arrow.

In FIGS. 1, 4, 7, 10 and 13, each lens group and each group are represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an Example-by-Example basis. Accordingly, even when the same combination of a symbol and a numeral is used between Examples, such usage does not mean the same configuration.

Tables 1 to 5 are shown below. Among these tables, Table 1 is a table showing each data item in First Example, Table 2 is that in Second Example, Table 3 is that in Third Example, Table 4 is that in Fourth Example, and Table 5 is that in Fifth Example. In each Example, for calculation of aberration characteristics, d-line (wavelength $\lambda$=587.6 nm), and g-line (wavelength $\lambda$=435.8 nm) are selected.

In the table of [General Data], f indicates the focal length of the entire lens system, FNO indicates the F-number, $2\omega$ indicates the angle of view (the unit is ° (degrees), and $\omega$ is the half angle of view), and Ymax indicates the maximum image height. TL indicates a distance obtained by adding Bf to the distance from the lens foremost surface to the lens last surface on the optical axis upon focusing on infinity. Bf indicates the distance (back focus) from the lens last surface to the image surface I on the optical axis upon focusing on infinity. Note that these values are indicated for corresponding zoom states at the wide-angle end (W), and the telephoto end (T).

In the tables of [General Data] in First to Fourth Examples, $\beta$F1t indicates the magnification of the first focusing lens group upon focusing on infinity in the telephoto end state. $\beta$F1w indicates the magnification of the first focusing lens group upon focusing on infinity in the wide angle end state. $\beta$F2t indicates the magnification of the second focusing lens group upon focusing on infinity in the telephoto end state. $\beta$F2w indicates the magnification of the second focusing lens group upon focusing on infinity in the wide angle end state. $\beta$BF2w indicates the combined magnification of lens groups from the second focusing lens group to a lens group closest to the image surface in the wide angle end state. $\beta$Brw indicates the combined magnification of lens groups disposed closer to the image surface than the second focusing lens group in the wide angle end state. $\Delta$X1w indicates the amount of movement of the first focusing lens group upon focusing from the infinity object to a very short distance object in the wide angle end state. $\Delta$X2w indicates the amount of movement of the second focusing lens group upon focusing from the infinity object to the very short distance object in the wide angle end state. fF2 indicates the focal length of the second focusing lens group. fAF2w indicates the combined focal length of lens groups that are from a lens group closest to the object to the second focusing lens group in the wide angle end state. fBF2w indicates the combined focal length of lens groups from the second focusing lens group to a lens group closest to the image surface in the wide angle end state. fBrw indicates the combined focal length of lens groups disposed closer to the image surface than the second focusing lens group in the wide angle end state. fAt indicates the focal length of the front group in the telephoto end state.

In the table of [General Data] in Fifth Example, $\beta$F2w indicates the magnification of the focusing lens group in the wide angle end state. $\beta$BF2w indicates the combined magnification of lens groups from the focusing lens group to a lens group closest to the image surface in the wide angle end state. $\beta$Brw indicates the combined magnification of lens groups disposed closer to the image surface than the focusing lens group in the wide angle end state. fF2 indicates the focal length of the focusing lens group. AF2w indicates the combined focal length of lens groups that are from a lens group closest to the object to the focusing lens group in the wide angle end state. fBF2w indicates the combined focal length of lens groups from the focusing lens group to a lens group closest to the image surface in the wide angle end state. fBrw indicates the combined focal length of lens groups disposed closer to the image surface than the focusing lens group in the wide angle end state.

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the distance on the optical axis from each optical surface to the next optical surface (or the image surface), nd is the refractive index of the material of the optical member for d-line, and vd indicates the Abbe number of the material of the optical member with reference to d-line. The radius of curvature "∞" indicates a plane or an opening. (S) indicates an aperture stop S. The description of the air refractive index nd=1.00000 is omitted.

The table of [Variable Distance Data] shows the surface distance at each surface number i where the surface distance is (Di) in the table showing [Lens Data]. The table of [Variable Distance Data] shows the surface distance upon focusing on infinity, and the surface distance upon focusing on a very short distance object.

The table of [Lens Group Data] shows the first surface (the surface closest to the object) and the focal length of each lens group.

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited thereto.

The descriptions of the tables so far are common to all the Examples. Redundant descriptions are hereinafter omitted.

First Example

First Example is described with reference to FIGS. 1, 2A and 2B, 3A and 3B, and Table 1. FIG. 1 is a lens configuration diagram of a zoom optical system ZL(1) according to First Example. The zoom optical system ZL(1) consists of, in order from the object: a first lens group G1 having a positive refractive power; a second lens group G2 having a negative refractive power; a third lens group G3 having a positive refractive power; an aperture stop S; a fourth lens group G4 having a positive refractive power; a fifth lens group G5 having a negative refractive power; and a sixth lens group having a positive refractive power. The image surface I is disposed subsequent to the sixth lens group G6.

In this Example, the fourth lens group G4 functions as the first focusing lens group GF1, and the fifth lens group G5 functions as the second focusing lens group GF2. That is, the first lens group G1, the second lens group G2 and the third lens group G3 constitute the front group GA that is fixed with respect to the image surface I upon focusing. The fourth lens group G4, the fifth lens group G5 and the sixth lens group G6 constitute the rear group GB.

The first lens group G1, the third lens group G3, the fourth lens group G4, the fifth lens group G5 and the sixth lens group G6 move along trajectories respectively indicated by arrows at the lower part of FIG. 1, upon zooming from the wide angle end state (W) to the telephoto end state (T). Accordingly, the distances between the lens groups adjacent to each other are changed, and the photographing magnification is changed (zooming is performed). The second lens group G2 is fixed, and does not move during zooming. Upon focusing from the infinity object to the short distance object, the fourth lens group G4 and the fifth lens group G5 move toward the image surface respectively along trajectories different from each other, as indicated by arrows at the upper part of FIG. 1.

The first lens group G1 consists of: a positive cemented lens that consists of a negative meniscus lens L11 having a convex surface facing the object, and a positive meniscus lens L12 having a convex surface facing the object; and a biconvex positive lens L13. The second lens group G2 consists of: a biconcave negative lens L21; a biconvex positive lens L22; a biconcave negative lens L23; and a biconcave negative lens L24. The third lens group G3 consists of: a biconvex positive lens L31; a positive cemented lens that consists of a negative meniscus lens L32 having a convex surface facing the object, and a biconvex positive lens L33; and a positive cemented lens that consists of a biconvex positive lens L34, and a biconcave negative lens L35.

The fourth lens group G4 consists of: a biconvex positive lens L41; a negative meniscus lens L42 having a convex surface facing an object; and a positive meniscus lens L43 having a convex surface facing the object. The fifth lens group G5 consists of: a positive meniscus lens L51 having a concave surface facing the object; and a biconvex negative lens L52.

The sixth lens group G6 consists of: a positive meniscus lens L61 having a concave surface facing the object; and a negative meniscus lens L62 having a concave surface facing the object. A parallel plate PP is disposed before the image surface I.

Table 1 lists values of data on the zoom optical system according to First Example.

TABLE 1

| [General Data] | |
|---|---|
| Zooming ratio = 2.691 | |
| βF1t = 0.39 | βF1w = 0.42 |
| βF2t = 3.10 | βF2w = 2.56 |
| βBF2w = 1.73 | βBrw = 0.68 |
| ΔX1w = 2.93 | ΔX2w = 4.92 |
| fF2 = −41.42 | fAF2w = 272.76 |
| fBF2w = −72.93 | fBrw = 116.51 |
| fAt = 106.58 | |

| | W | M | T |
|---|---|---|---|
| f | 72.10 | 102.64 | 194.00 |
| FNO | 4.10 | 4.10 | 4.11 |
| 2ω | 33.77 | 23.58 | 12.36 |
| Ymax | 21.60 | 21.60 | 21.60 |
| TL | 167.56 | 185.12 | 204.48 |
| BF | 37.76 | 40.23 | 51.42 |

| [Lens Data] | | | | |
|---|---|---|---|---|
| Surface Number | R | D | nd | vd |
| Object Surface | ∞ | | | |
| 1 | 144.8366 | 1.00 | 1.8000 | 29.84 |
| 2 | 73.1116 | 5.85 | 1.5952 | 67.73 |
| 3 | 302.7125 | 0.10 | | |
| 4 | 68.5085 | 7.10 | 1.4970 | 81.14 |
| 5 | −2151.2492 | (D5) | | |
| 6 | −1656.3623 | 1.00 | 1.7200 | 46.02 |
| 7 | 33.5940 | 1.06 | | |
| 8 | 34.1723 | 7.56 | 1.8414 | 24.56 |
| 9 | −119.9733 | 0.78 | | |
| 10 | −139.3696 | 1.00 | 1.8062 | 40.91 |
| 11 | 53.2947 | 4.69 | | |
| 12 | −43.3327 | 1.00 | 1.7620 | 40.10 |
| 13 | 295.7341 | (D13) | | |

TABLE 1-continued

| | | | | |
|---|---|---|---|---|
| 14 | 265.1264 | 3.48 | 1.6400 | 60.08 |
| 15 | −69.2515 | 2.00 | | |
| 16 | 60.6882 | 1.00 | 1.8010 | 34.92 |
| 17 | 29.8803 | 5.94 | 1.6400 | 60.08 |
| 18 | −155.7130 | 2.00 | | |
| 19 | 30.4340 | 5.81 | 1.4875 | 70.32 |
| 20 | −100.4347 | 1.59 | 1.8061 | 40.93 |
| 21 | 46.2910 | 2.11 | | |
| 22(S) | ∞ | (D22) | | |
| 23 | 99.4135 | 2.72 | 1.6204 | 60.29 |
| 24 | −317.0281 | 0.27 | | |
| 25 | 51.7395 | 1.00 | 1.8850 | 30.16 |
| 26 | 27.3631 | 6.31 | | |
| 27 | 32.8360 | 4.31 | 1.7200 | 43.69 |
| 28 | 3964.4455 | (D28) | | |
| 29 | −295.2690 | 3.45 | 1.7618 | 26.52 |
| 30 | −47.8221 | 3.63 | | |
| 31 | −37.3306 | 1.00 | 1.7725 | 49.62 |
| 32 | 41.6899 | (D32) | | |
| 33 | −197.5318 | 4.59 | 1.7645 | 49.10 |
| 34 | −33.3333 | 0.41 | | |
| 35 | −36.7436 | 1.00 | 1.6129 | 37.00 |
| 36 | −102.1283 | (D36) | | |
| 37 | ∞ | 1.60 | 1.5168 | 64.13 |
| 38 | ∞ | 2.00 | | |
| Image Surface | ∞ | | | |

[Lens Group Data]

| Group | First surface | Focal length |
|---|---|---|
| 1 | 1 | 122.414 |
| 2 | 6 | −31.567 |
| 3 | 14 | 44.395 |
| 4 | 23 | 63.962 |
| 5 | 29 | −41.417 |
| 6 | 33 | 116.512 |

[Variable Distance Data]

| | Infinity | | | Very short distance | | |
|---|---|---|---|---|---|---|
| | W | M | T | W | M | T |
| F | 72.100 | 102.642 | 194.000 | 67.277 | 91.500 | 139.931 |
| D5 | 2.000 | 19.657 | 39.000 | 2.000 | 19.656 | 39.000 |
| D13 | 22.402 | 17.047 | 2.100 | 22.402 | 17.047 | 2.100 |
| D22 | 11.833 | 8.529 | 8.879 | 14.761 | 11.609 | 10.640 |
| D28 | 2.330 | 1.793 | 2.000 | 4.318 | 5.420 | 13.231 |
| D32 | 6.916 | 13.556 | 16.771 | 2.000 | 6.848 | 3.780 |
| D36 | 34.707 | 37.174 | 48.360 | 34.708 | 37.174 | 48.360 |

Figure 2A:
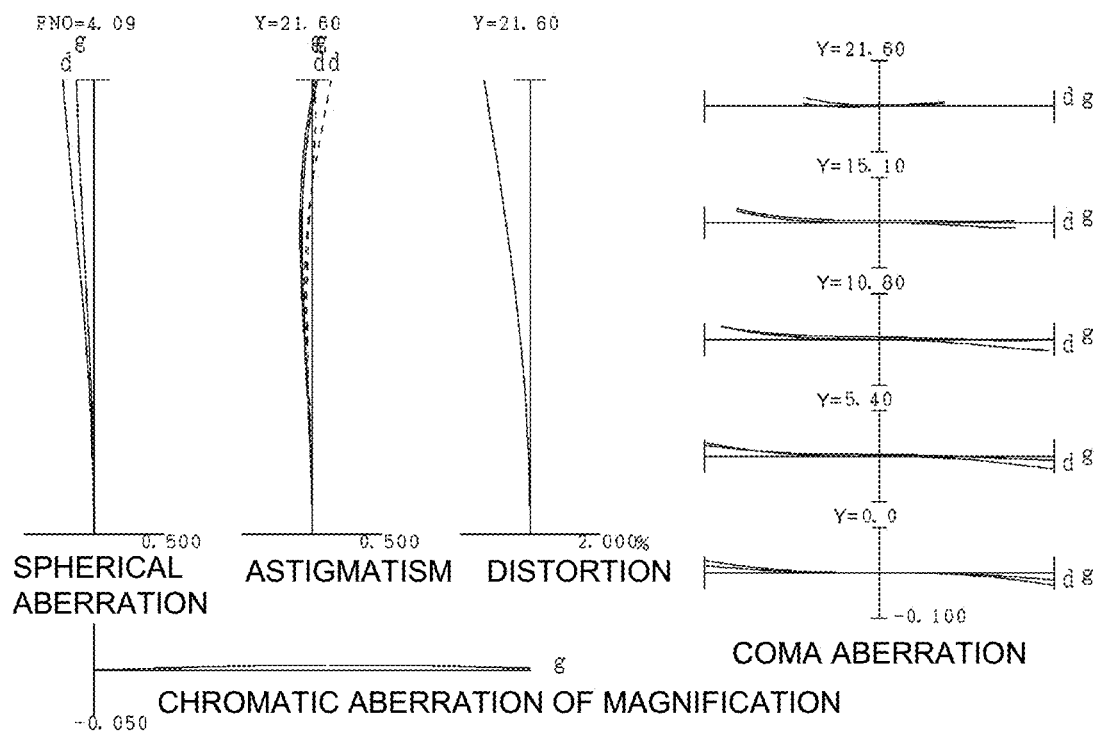
FIGS. 2A and 2B are graphs respectively showing various aberrations of the zoom optical system according to First Example upon focusing on infinity in a wide-angle end state and a telephoto end state.
Figure 2B:
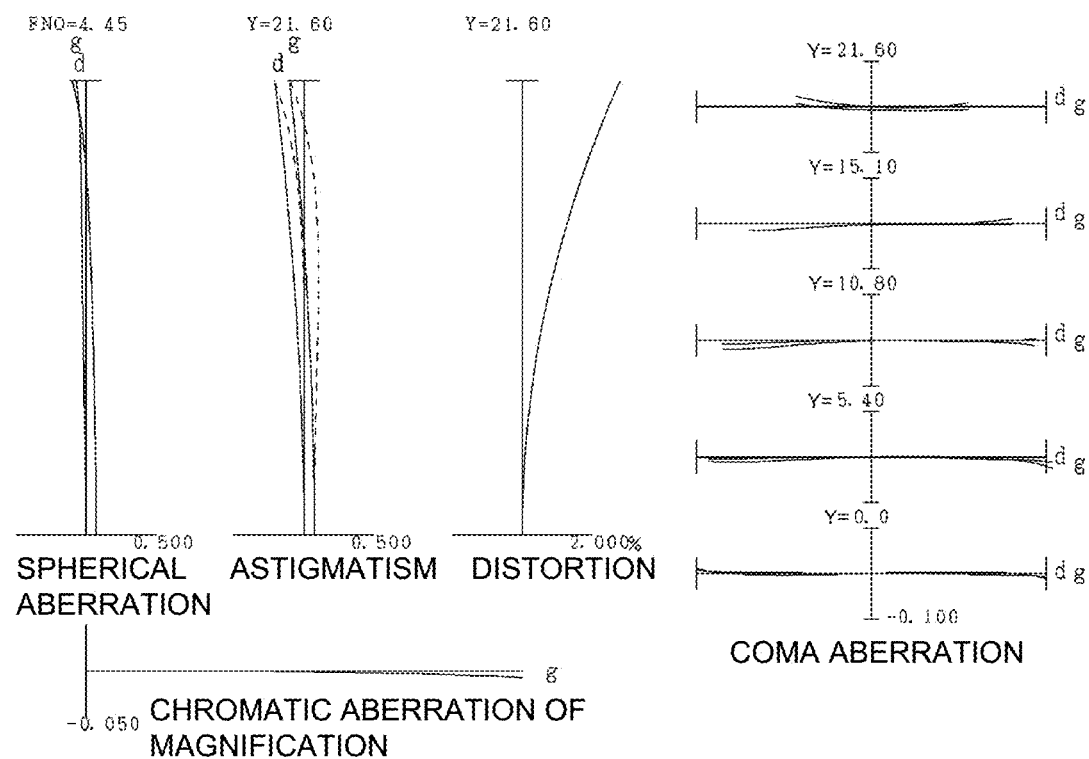
Figure 3A:
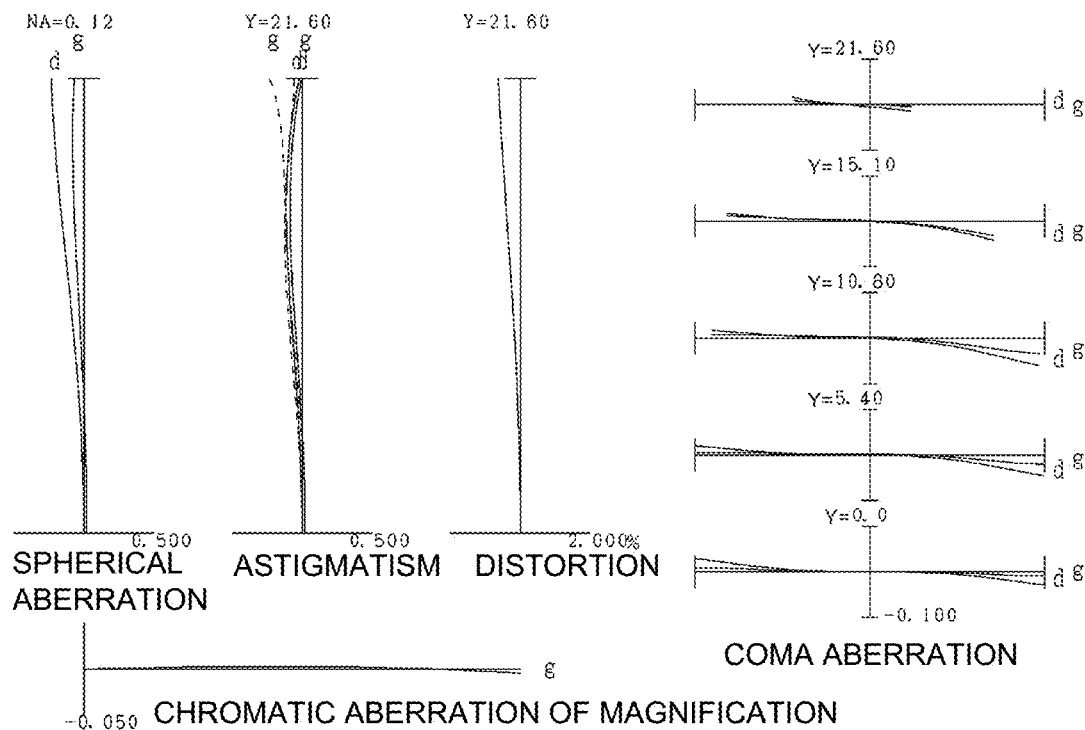
FIGS. 3A and 3B are graphs respectively showing various aberrations of the zoom optical system according to First Example upon focusing on a short distance object in the wide-angle end state and the telephoto end state.
Figure 3B:
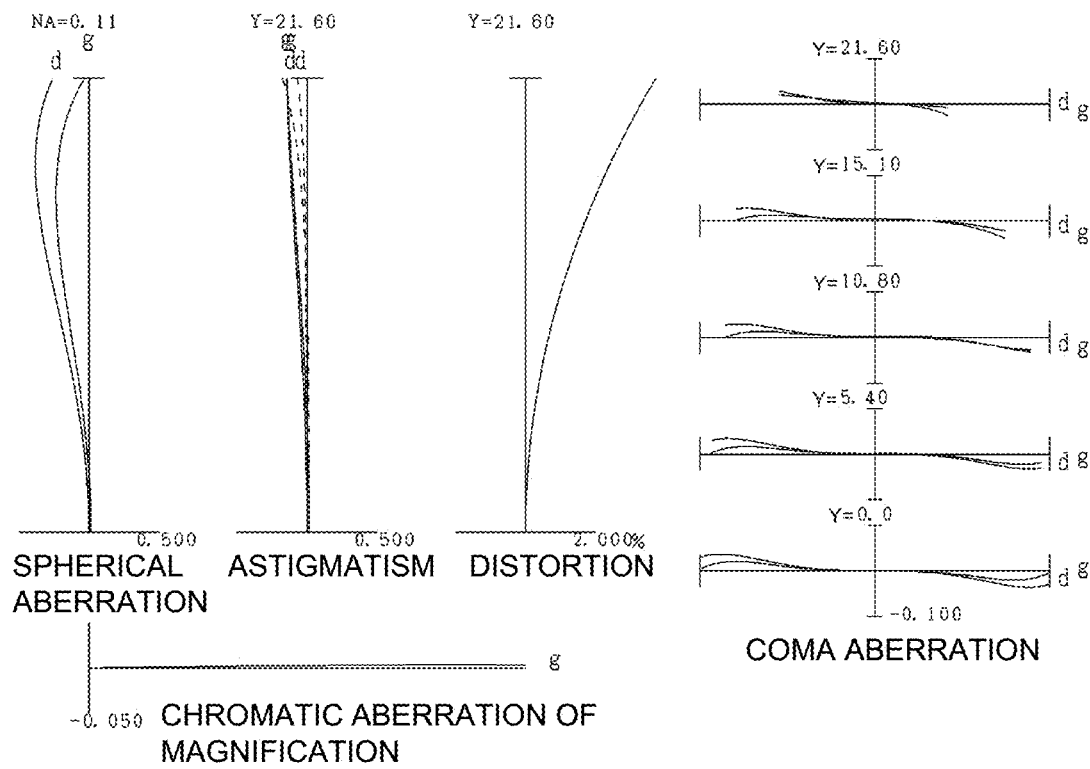

FIG. 2A shows various aberration graphs of the zoom optical system according to First Example upon focusing on infinity in the wide angle end state. FIG. 2B shows various aberration graphs of the zoom optical system according to First Example upon focusing on infinity in the telephoto end state. FIG. 3A shows various aberration graphs of the zoom optical system according to First Example upon focusing on a short distance object in the wide angle end state. FIG. 3B shows various aberration graphs of the zoom optical system according to First Example upon focusing on the short distance object in the telephoto end state. In each aberration graph upon focusing on infinity, FNO indicates the F-number, and Y indicates the image height. In each aberration graph upon focusing on the short distance object, NA indicates the numerical aperture, and Y indicates the image height. Note that the spherical aberration graph indicates the value of the F-number or the numerical aperture that corresponds to the maximum diameter. The astigmatism graph and the distortion graph each indicate the maximum value of the image height. The coma aberration graph indicates the value of the corresponding image height. The symbol d indicates d-line (wavelength λ=587.6 nm). The symbol g indicates g-line (wavelength λ=435.8 nm). In the astigmatism graph, a solid line indicates a sagittal image surface, and a broken line indicates a meridional image surface. Note that also in the following aberration graphs in each Example, symbols similar to those in this Example are used, and redundant description is omitted.

The various aberration graphs show that the zoom optical system according to First Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Second Example

Figure 4:
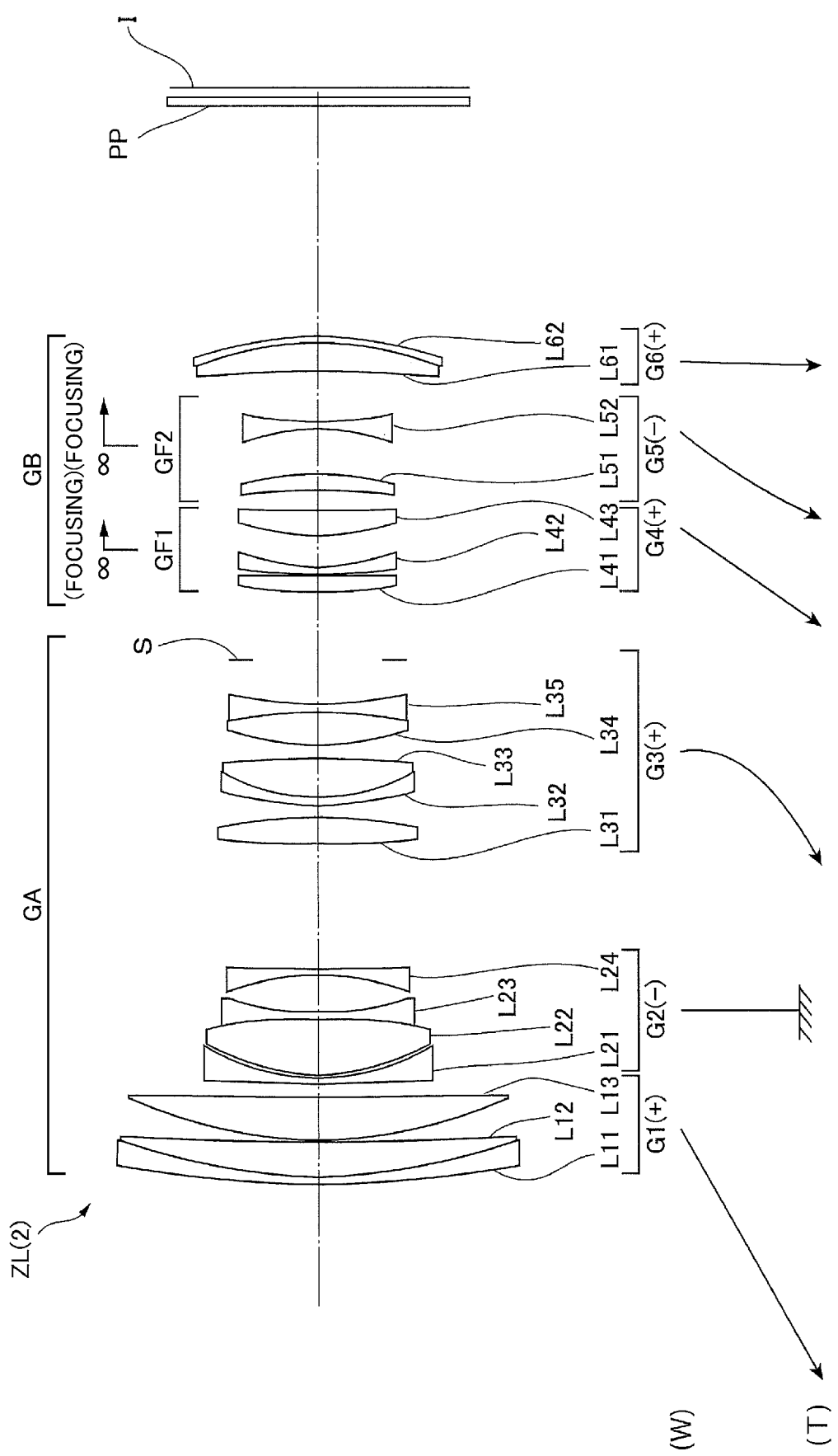
FIG. 4 shows a lens configuration of a zoom optical system according to Second Example.

Second Example is described with reference to FIGS. 4, 5A and 5B, 6A and 6B, and Table 2. FIG. 4 is a lens configuration diagram of a zoom optical system ZL(2) according to Second Example. The zoom optical system ZL(2) consists of, in order from the object: a first lens group G1 having a positive refractive power; a second lens group G2 having a negative refractive power; a third lens group G3 having a positive refractive power; an aperture stop S; a fourth lens group G4 having a positive refractive power; a fifth lens group G5 having a negative refractive power; and a sixth lens group having a positive refractive power. The image surface I is disposed subsequent to the sixth lens group G6.

In this Example, the fourth lens group G4 functions as the first focusing lens group GF1, and the fifth lens group G5 functions as the second focusing lens group GF2. That is, the first lens group G1, the second lens group G2 and the third lens group G3 constitute the front group GA that is fixed with respect to the image surface I upon focusing. The fourth lens group G4, the fifth lens group G5 and the sixth lens group G6 constitute the rear group GB.

The first lens group G1, the third lens group G3, the fourth lens group G4, the fifth lens group G5 and the sixth lens group G6 move along trajectories respectively indicated by arrows at the lower part of FIG. 4, upon transition from the wide angle end state (W) to the telephoto end state (T). Accordingly, the distances between the lens groups adjacent to each other are changed, and the photographing magnification is changed (zooming is performed). The second lens group G2 is fixed, and does not move during zooming. Upon focusing from the infinity object to the short distance object, the fourth lens group G4 and the fifth lens group G5 move toward the image surface respectively along trajectories different from each other, as indicated by arrows at the upper part of FIG. 4.

The first lens group G1 consists of: a positive cemented lens that consists of a negative meniscus lens L11 having a convex surface facing the object, and a positive meniscus lens L12 having a convex surface facing the object; and a positive meniscus lens L13 having a convex surface facing the object. The second lens group G2 consists of: a negative meniscus lens L21 having a convex surface facing the object; a biconvex positive lens L22; a biconcave negative lens L23; and a biconcave negative lens L24. The third lens group G3 consists of: a biconvex positive lens L31; a positive cemented lens that consists of a negative meniscus lens L32 having a convex surface facing the object, and a biconvex positive lens L33; and a positive cemented lens that consists of a biconvex positive lens L34, and a biconcave negative lens L35.

The fourth lens group G4 consists of: a biconvex positive lens L41; a negative meniscus lens L42 having a convex surface facing the object; and a biconvex positive lens L43. The fifth lens group G5 consists of: a positive meniscus lens L51 having a concave surface facing the object; and a biconcave negative lens L52.

The sixth lens group G6 consists of: a positive meniscus lens L61 having a concave surface facing the object; and a negative meniscus lens L62 having a concave surface facing the object. A parallel plate PP is disposed before the image surface I.

Table 2 lists values of data on the zoom optical system according to Second Example.

TABLE 2

[General Data]
Zooming ratio = 2.691

| $\beta F1t = 0.32$ | $\beta F1w = 0.37$ |
|---|---|
| $\beta F2t = 3.37$ | $\beta F2w = 3.02$ |
| $\beta BF2w = 1.70$ | $\beta Brw = 0.56$ |
| $\Delta X1w = 3.31$ | $\Delta X2w = 5.65$ |
| $fF2 = -37.31$ | $fAF2w = 317.67$ |
| $fBF2w = -85.60$ | $fBrw = 83.79$ |
| $fAt = 128.32$ | |

| | W | M | T |
|---|---|---|---|
| f | 72.10 | 105.00 | 194.00 |
| FNO | 4.10 | 4.10 | 4.10 |
| 2ω | 33.64 | 22.98 | 12.30 |
| Ymax | 21.60 | 21.60 | 21.60 |
| TL | 167.32 | 186.91 | 205.27 |
| BF | 37.23 | 37.15 | 37.11 |

[Lens Data]

| Surface Number | R | D | nd | νd |
|---|---|---|---|---|
| Object Surface | ∞ | | | |
| 1 | 164.2107 | 1.00 | 1.7950 | 28.69 |
| 2 | 81.6916 | 5.44 | 1.5932 | 67.90 |
| 3 | 541.7710 | 0.10 | | |
| 4 | 64.6180 | 6.69 | 1.4970 | 81.61 |
| 5 | 1556.5885 | (D5) | | |
| 6 | 372.6279 | 1.00 | 1.7200 | 46.02 |
| 7 | 31.3950 | 0.58 | | |
| 8 | 32.1189 | 8.32 | 1.7847 | 25.64 |
| 9 | −93.6053 | 0.11 | | |
| 10 | −119.9230 | 1.00 | 1.7725 | 49.62 |
| 11 | 44.7568 | 5.56 | | |
| 12 | −37.2692 | 1.00 | 1.8061 | 40.93 |
| 13 | 517.4010 | (D13) | | |
| 14 | 134.2064 | 4.10 | 1.6700 | 57.33 |
| 15 | −74.3373 | 2.00 | | |
| 16 | 55.0428 | 1.00 | 1.8010 | 34.92 |
| 17 | 27.3081 | 6.05 | 1.6400 | 60.19 |
| 18 | −146.5253 | 2.00 | | |
| 19 | 40.9804 | 5.06 | 1.4875 | 70.32 |
| 20 | −61.4029 | 1.34 | 1.8061 | 40.97 |
| 21 | 64.3603 | 6.64 | | |
| 22(S) | ∞ | (D22) | | |
| 23 | 76.0467 | 2.62 | 1.6700 | 47.23 |
| 24 | −457.2754 | 0.13 | | |
| 25 | 93.1674 | 1.00 | 1.9020 | 25.10 |
| 26 | 31.2834 | 4.96 | | |
| 27 | 37.8776 | 3.87 | 1.8919 | 37.13 |
| 28 | −3745.9359 | (D28) | | |
| 29 | −78.4678 | 2.39 | 1.8467 | 23.78 |
| 30 | −44.3923 | 6.95 | | |
| 31 | −34.1777 | 1.00 | 1.7725 | 49.62 |
| 32 | 53.9288 | (D32) | | |
| 33 | −268.3415 | 4.47 | 1.7550 | 52.32 |
| 34 | −47.4541 | 0.10 | | |
| 35 | −47.1341 | 1.00 | 1.6398 | 34.47 |

TABLE 2-continued

| 36 | −52.0094 | (D36) | | |
|---|---|---|---|---|
| 37 | ∞ | 1.60 | 1.5168 | 63.88 |
| 38 | ∞ | 1.00 | | |
| Image Surface | ∞ | | | |

[Lens Group Data]

| Group | First surface | Focal length |
|---|---|---|
| 1 | 1 | 116.302 |
| 2 | 6 | −27.897 |
| 3 | 14 | 42.018 |
| 4 | 23 | 63.113 |
| 5 | 29 | −37.306 |
| 6 | 33 | 83.793 |

[Variable Distance Data]

| | Infinity | | | Very short distance | | |
|---|---|---|---|---|---|---|
| | W | M | T | W | M | T |
| F | 72.100 | 105.000 | 194.000 | 66.728 | 93.257 | 133.735 |
| D5 | 2.000 | 21.665 | 40.000 | 2.000 | 21.664 | 39.999 |
| D13 | 18.985 | 14.768 | 2.100 | 18.986 | 14.768 | 2.100 |
| D22 | 10.417 | 6.804 | 12.049 | 13.730 | 9.913 | 16.049 |
| D28 | 3.010 | 2.588 | 4.969 | 5.345 | 6.845 | 18.954 |
| D32 | 7.649 | 15.901 | 20.943 | 2.000 | 8.534 | 2.958 |
| D36 | 35.170 | 35.093 | 35.120 | 35.170 | 35.094 | 35.120 |

Figure 5A:
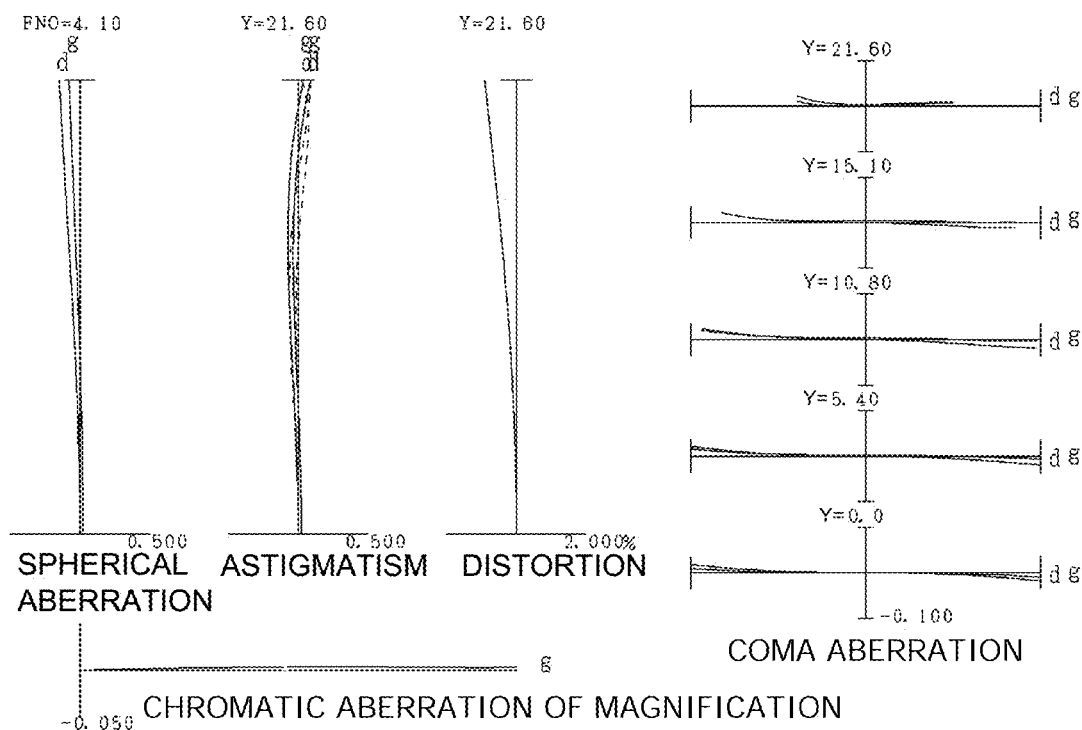
FIGS. 5A and 5B are graphs respectively showing various aberrations of the zoom optical system according to Second Example upon focusing on infinity in a wide-angle end state and a telephoto end state.
Figure 5B:
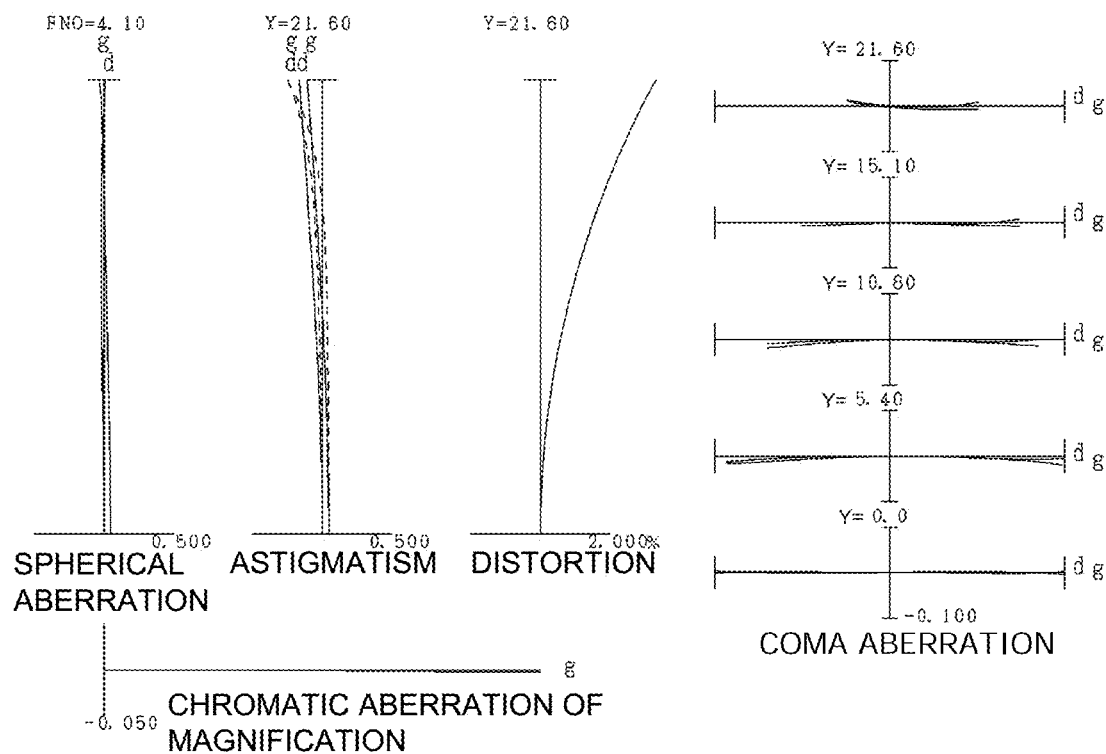
Figure 6A:
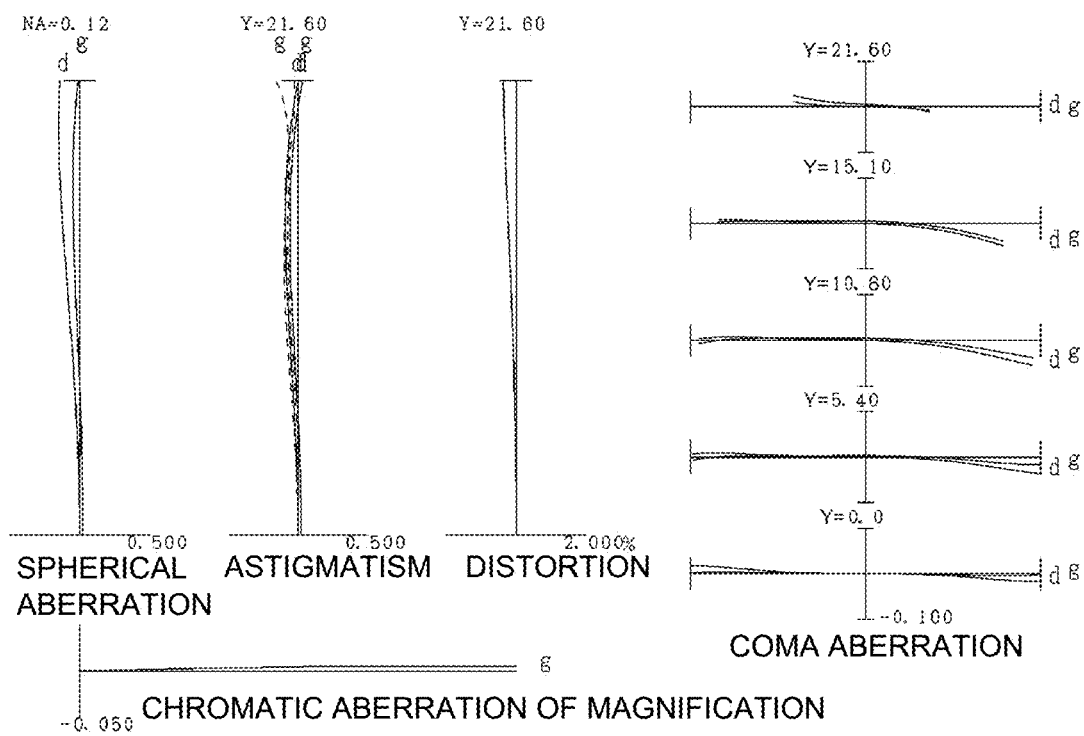
FIGS. 6A and 6B are graphs respectively showing various aberrations of the zoom optical system according to Second Example upon focusing on a short distance object in the wide-angle end state and the telephoto end state.
Figure 6B:
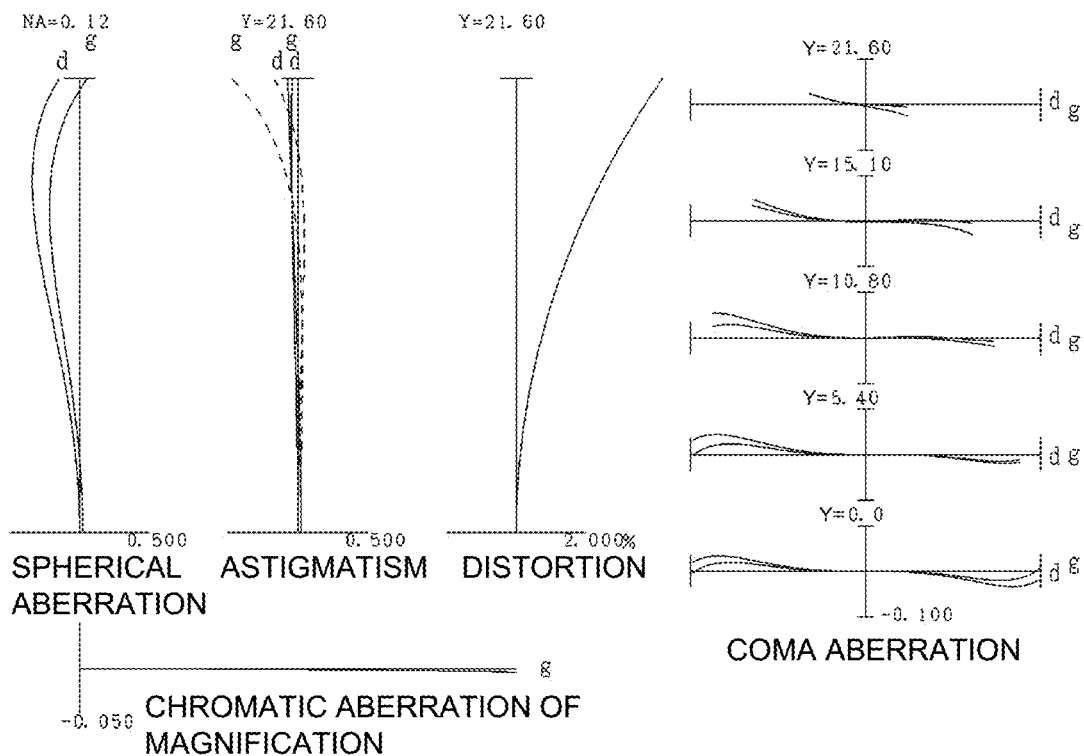

FIG. 5A shows various aberration graphs of the zoom optical system according to Second Example upon focusing on infinity in the wide angle end state. FIG. 5B shows various aberration graphs of the zoom optical system according to Second Example upon focusing on infinity in the telephoto end state. FIG. 6A shows various aberration graphs of the zoom optical system according to Second Example upon focusing on a short distance object in the wide angle end state. FIG. 6B shows various aberration graphs of the zoom optical system according to Second Example upon focusing on the short distance object in the telephoto end state. The various aberration graphs show that the zoom optical system according to Second Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Third Example

Figure 7:
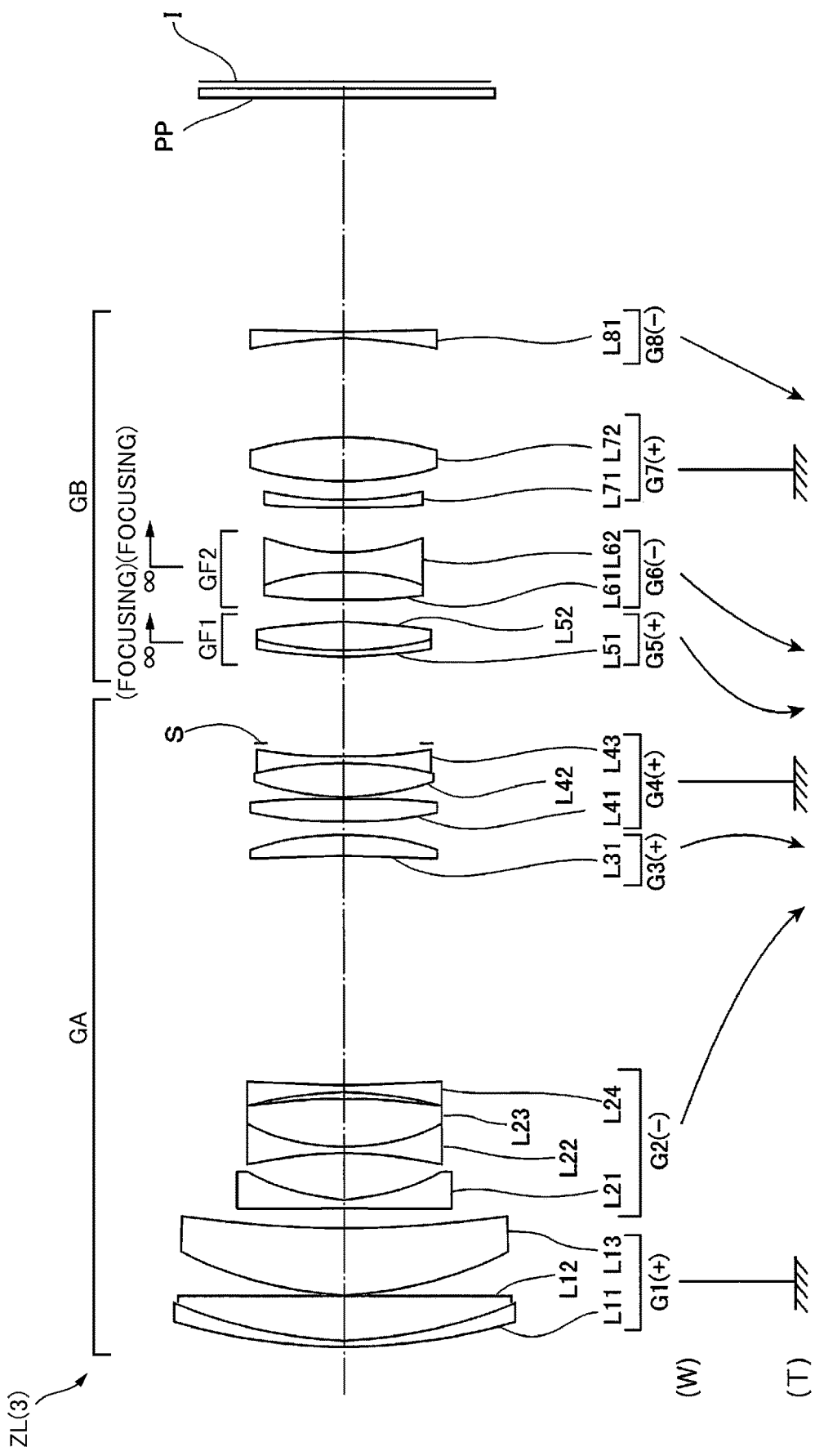
FIG. 7 shows a lens configuration of a zoom optical system according to Third Example.

Third Example is described with reference to FIGS. 7, 8A and 8B, 9A and 9B, and Table 3. FIG. 7 is a lens configuration diagram of a zoom optical system ZL(3) according to Third Example. The zoom optical system ZL(3) consists of, in order from the object: a first lens group G1 having a positive refractive power; a second lens group G2 having a negative refractive power; a third lens group G3 having a positive refractive power; a fourth lens group G4 having a positive refractive power; an aperture stop S; a fifth lens group G5 having a positive refractive power; a sixth lens group G6 having a negative refractive power; a seventh lens group G7 having a positive refractive power; and an eighth lens group having a negative refractive power. The image surface I is disposed subsequent to the eighth lens group G8.

In this Example, the fifth lens group G5 functions as the first focusing lens group GF1, and the sixth lens group G6 functions as the second focusing lens group GF2. That is, the first lens group G1, the second lens group G2, the third lens group G3 and the fourth lens group G4 constitute the front group GA that is fixed with respect to the image surface I upon focusing. The fifth lens group G5, the sixth lens group G6, the seventh lens group G7 and the eighth lens group G8 constitute the rear group GB.

The second lens group G2, the third lens group G3, the fifth lens group G5, the sixth lens group G6 and the eighth lens group G8 move along trajectories respectively indicated by arrows at the lower part of FIG. 7, upon zooming from the wide angle end state (W) to the telephoto end state (T). Accordingly, the distances between the lens groups adjacent to each other are changed, and the photographing magnification is changed (zooming is performed). The first lens group G1, the fourth lens group G4 and the seventh lens group G7 are fixed, and do not move upon zooming. Upon focusing from the infinity object to the short distance object, the fifth lens group G5 and the sixth lens group G6 move toward the image surface respectively on trajectories different from each other, as indicated by arrows at the upper part of FIG. 7.

The first lens group G1 consists of: a positive cemented lens that consists of a negative meniscus lens L11 having a convex surface facing the object, and a biconvex positive lens L12; and a positive meniscus lens L13 having a convex surface facing the object. The second lens group G2 consists of: a negative meniscus lens L21 having a convex surface facing the object; a negative cemented lens that consists of a biconcave negative lens L22, and a biconvex positive lens L23; and a biconcave negative lens L24. The third lens group G3 consists of a positive meniscus lens L31 having a concave surface facing the object. The fourth lens group G4 consists of: a biconvex positive lens L41; and a positive cemented lens that consists of a biconvex positive lens L42, and a biconcave negative lens L43.

The fifth lens group G5 consists of: a negative meniscus lens L51 having a convex surface facing the object; and a biconvex positive lens L52. The sixth lens group G6 consists of a negative cemented lens that consists of a biconvex positive lens L61, and a biconcave negative lens L62.

The seventh lens group G7 consists of: a negative meniscus lens L71 having a convex surface facing the object; and a biconvex positive lens L72. The eighth lens group G8 consists of a biconcave negative lens L81. A parallel plate PP is disposed before the image surface I.

Table 3 lists values of data on the zoom optical system according to Third Example.

TABLE 3

[General Data]
Zooming ratio = 2.708

| βF1t = 0.44 | βF1w = 0.38 |
|---|---|
| βF2t = 3.33 | βF2w = 4.29 |
| βBF2w = 1.78 | βBrw = 0.41 |
| ΔX1w = 1.52 | ΔX2w = 3.50 |
| fF2 = −47.48 | fAF2w = 208.32 |
| fBF2w = −69.91 | fBrw = 117.19 |
| fAt = 174.21 | |

| | W | M | T |
|---|---|---|---|
| f | 72.01 | 131.40 | 195.00 |
| FNO | 4.10 | 4.10 | 4.11 |
| 2ω | 33.51 | 18.53 | 12.50 |
| Ymax | 21.60 | 21.60 | 21.60 |

TABLE 3-continued

| TL | 190.10 | 191.04 | 190.02 |
|---|---|---|---|
| BF | 37.67 | 42.70 | 46.99 |

[Lens Data]

| Surface Number | R | D | nd | νd |
|---|---|---|---|---|
| Object Surface | ∞ | | | |
| 1 | 90.2355 | 1.00 | 1.9500 | 29.37 |
| 2 | 60.7702 | 6.89 | 1.4970 | 81.64 |
| 3 | −2196.2816 | 0.10 | | |
| 4 | 51.3148 | 10.01 | 1.4970 | 81.61 |
| 5 | 179.5132 | (D5) | | |
| 6 | 434.7890 | 1.49 | 1.8503 | 32.35 |
| 7 | 29.2567 | 6.81 | | |
| 8 | −72.2823 | 1.00 | 1.4970 | 81.64 |
| 9 | 34.2350 | 7.14 | 2.0007 | 25.46 |
| 10 | −94.3337 | 1.07 | | |
| 11 | −56.0853 | 1.00 | 1.8061 | 33.34 |
| 12 | 165.1965 | (D12) | | |
| 13 | −248.3690 | 3.29 | 1.7000 | 48.10 |
| 14 | −52.8624 | (D14) | | |
| 15 | 89.5312 | 3.40 | 1.5168 | 64.13 |
| 16 | −155.4452 | 0.10 | | |
| 17 | 36.4241 | 5.38 | 1.4875 | 70.32 |
| 18 | −64.2538 | 1.00 | 2.0010 | 29.12 |
| 19 | 89.8281 | 1.77 | | |
| 20(S) | ∞ | (D20) | | |
| 21 | 73.1095 | 1.00 | 1.7995 | 42.09 |
| 22 | 54.6786 | 0.10 | | |
| 23 | 51.1000 | 4.20 | 1.4970 | 81.64 |
| 24 | −68.2409 | (D24) | | |
| 25 | 99.5195 | 4.17 | 1.7847 | 25.64 |
| 26 | −37.0958 | 2.83 | 1.8485 | 43.79 |
| 27 | 30.2592 | (D27) | | |
| 28 | 278.5010 | 1.00 | 1.7174 | 29.57 |
| 29 | 51.0864 | 3.14 | | |
| 30 | 54.9583 | 6.33 | 1.7550 | 52.33 |
| 31 | −46.7106 | (D31) | | |
| 32 | −69.7842 | 1.00 | 1.8340 | 37.18 |
| 33 | 306.8074 | (D33) | | |
| 34 | ∞ | 1.60 | 1.5168 | 63.88 |
| 35 | ∞ | 1.00 | | |
| Image Surface | ∞ | | | |

[Lens Group Data]

| Group | First surface | Focal length |
|---|---|---|
| 1 | 1 | 96.608 |
| 2 | 6 | −35.022 |
| 3 | 13 | 95.276 |
| 4 | 15 | 199.774 |
| 5 | 21 | 75.812 |
| 6 | 25 | −47.481 |
| 7 | 28 | 51.745 |
| 8 | 32 | −68.087 |

[Variable Distance Data]

| | Infinity | | | Very short distance | | |
|---|---|---|---|---|---|---|
| | W | M | T | W | M | T |
| F | 72.010 | 131.396 | 195.000 | 67.773 | 110.730 | 138.226 |
| D5 | 2.678 | 23.180 | 35.000 | 2.678 | 23.180 | 35.000 |
| D12 | 34.322 | 15.720 | 2.000 | 34.322 | 15.720 | 2.000 |
| D14 | 2.100 | 0.200 | 2.100 | 2.100 | 0.200 | 2.100 |
| D20 | 12.892 | 3.238 | 2.000 | 14.414 | 4.678 | 4.082 |
| D24 | 3.423 | 5.836 | 2.248 | 5.401 | 11.525 | 13.631 |
| D27 | 6.791 | 14.033 | 18.859 | 3.291 | 6.903 | 5.394 |
| D31 | 14.888 | 9.803 | 5.493 | 14.889 | 9.803 | 5.493 |
| D33 | 35.176 | 40.197 | 44.490 | 35.176 | 40.197 | 44.490 |

Figure 8A:
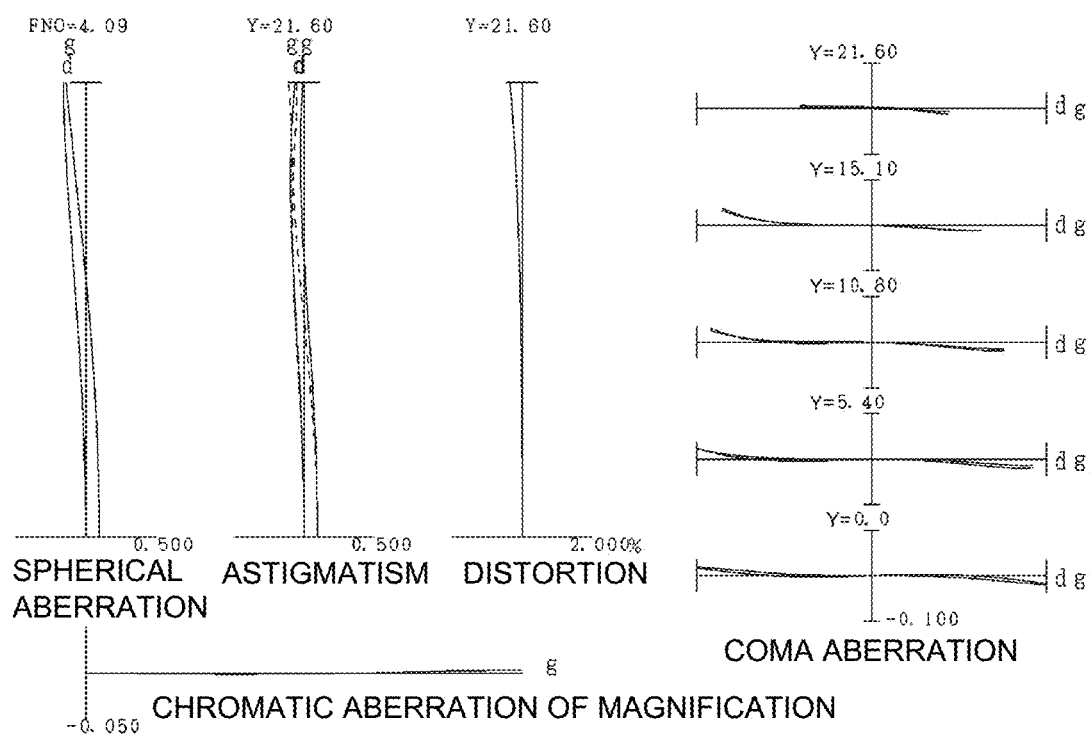
FIGS. 8A and 8B are graphs respectively showing various aberrations of the zoom optical system according to Third Example upon focusing on infinity in a wide-angle end state and a telephoto end state.
Figure 8B:
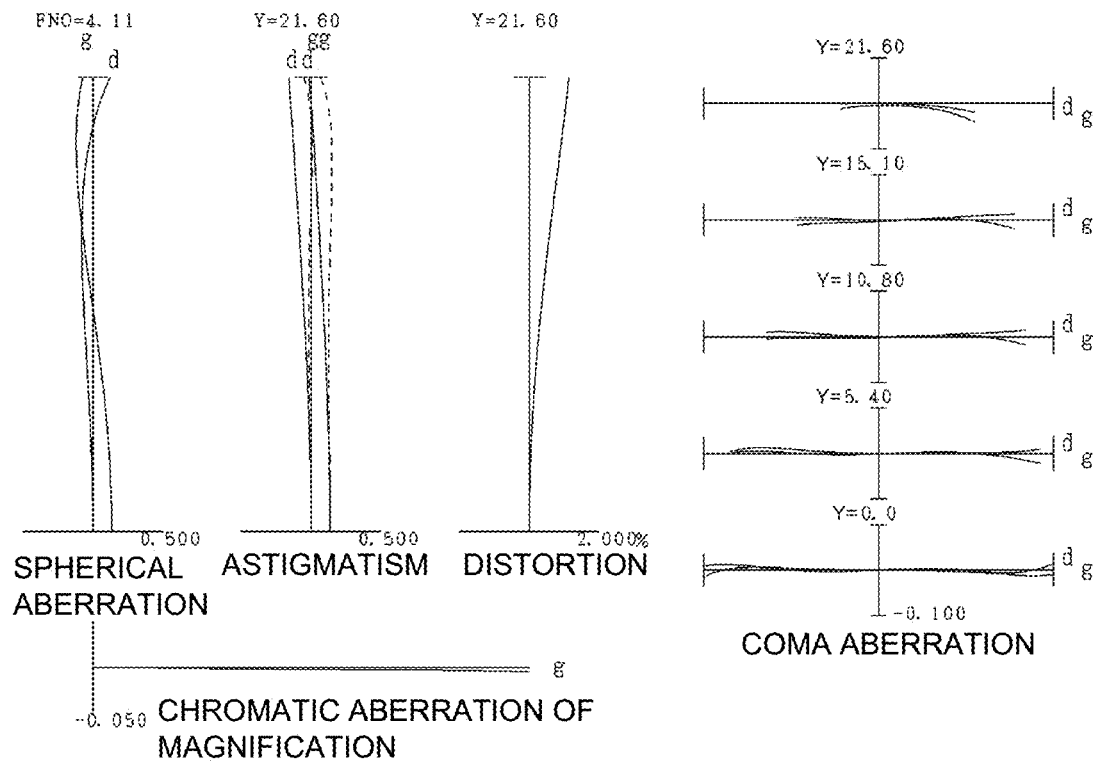
Figure 9A:
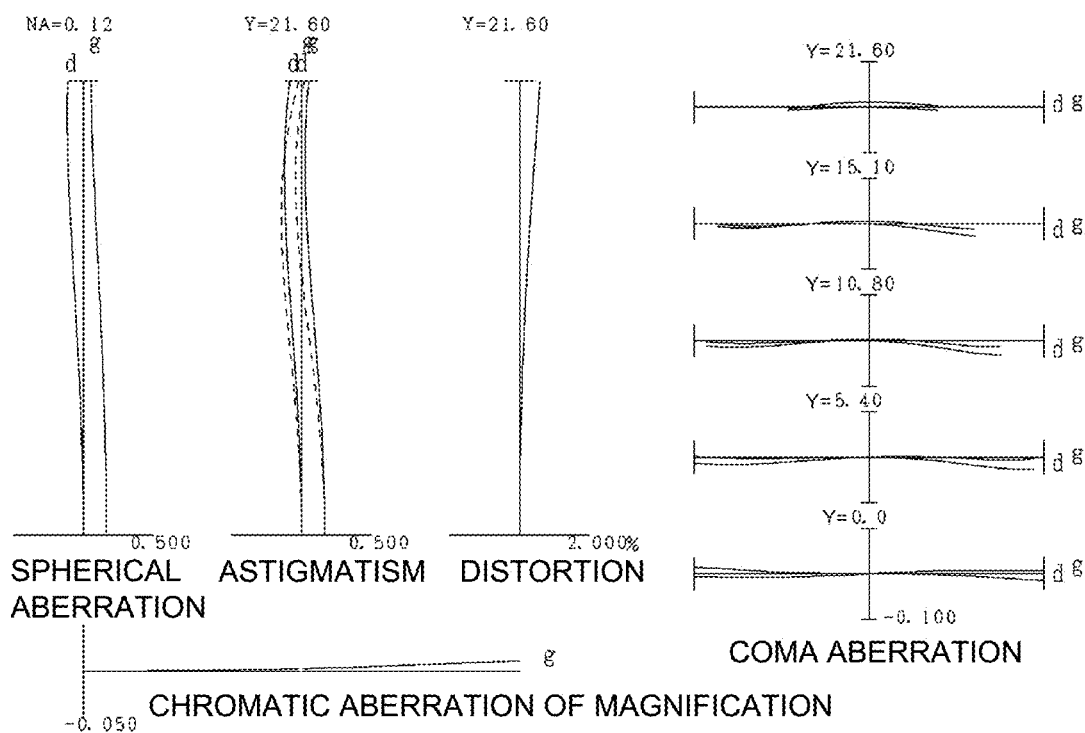
FIGS. 9A and 9B are graphs respectively showing various aberrations of the zoom optical system according to Third Example upon focusing on a short distance object in the wide-angle end state and the telephoto end state.
Figure 9B:
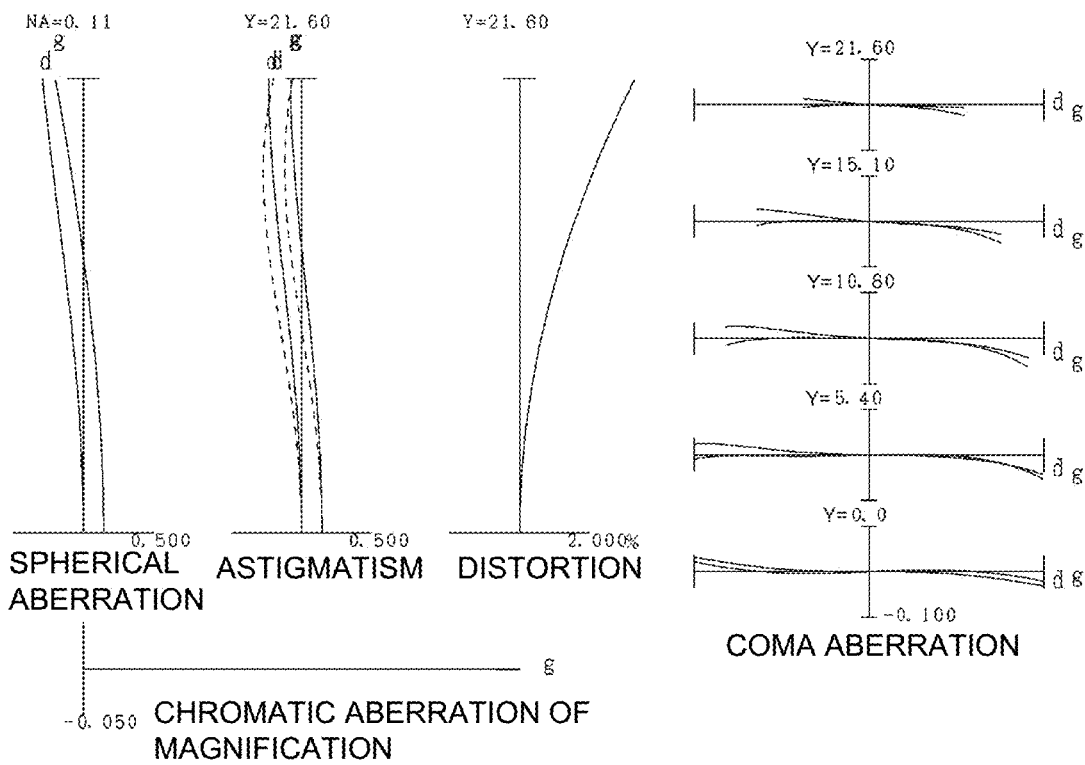

FIG. 8A shows various aberration graphs of the zoom optical system according to Third Example upon focusing on infinity in the wide angle end state. FIG. 8B shows various aberration graphs of the zoom optical system according to Third Example upon focusing on infinity in the telephoto end state. FIG. 9A shows various aberration graphs of the zoom optical system according to Third Example upon focusing on a short distance object in the wide angle end state. FIG. 9B shows various aberration graphs of the zoom optical system according to Third Example upon focusing on the short distance object in the telephoto end state. The various aberration graphs show that the zoom optical system according to Third Example favorably corrects various aberrations, and exerts excellent imaging performance, in the entire range from focusing on infinity to focusing on the short distance object. Accordingly, even in the case of focusing on the short distance object, the variation in angle of view upon focusing can be reduced while securing a favorable optical performance.

Fourth Example

Figure 10:
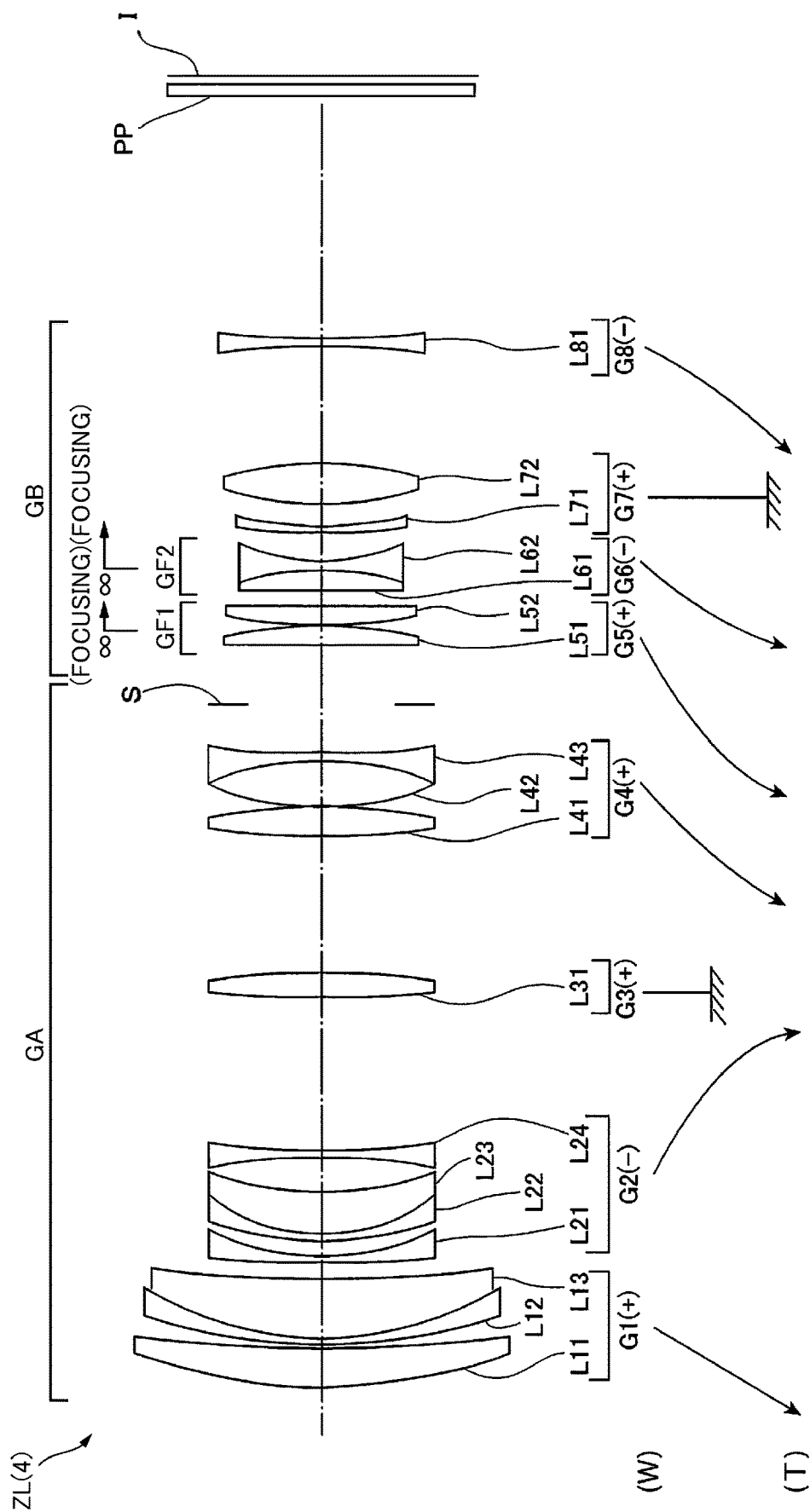
FIG. 10 shows a lens configuration of a zoom optical system according to Fourth Example.

Fourth Example is described with reference to FIGS. 10, 11A and 11B, 12A and 12B, and Table 4. FIG. 10 is a lens configuration diagram of a zoom optical system ZL(4) according to Fourth Example. The zoom optical system ZL(4) consists of, in order from the object: a first lens group G1 having a positive refractive power; a second lens group G2 having a negative refractive power; a third lens group G3 having a positive refractive power; a fourth lens group G4 having a positive refractive power; a fifth lens group G5 having a positive refractive power; an aperture stop S disposed in the fifth lens group G5; a sixth lens group G6 having a negative refractive power; a seventh lens group G7 having a positive refractive power; and an eighth lens group having a negative refractive power. The image surface I is disposed subsequent to the eighth lens group G8.

In this Example, the fifth lens group G5 functions as the first focusing lens group GF1, and the sixth lens group G6 functions as the second focusing lens group GF2. That is, the first lens group G1, the second lens group G2, the third lens group G3 and the fourth lens group G4 constitute the front group GA that is fixed with respect to the image surface I upon focusing. The fifth lens group G5, the sixth lens group G6, the seventh lens group G7 and the eighth lens group G8 constitute the rear group GB.

The first lens group G1, the second lens group G2, the fourth lens group G4, the fifth lens group G5, the sixth lens group G6 and the eighth lens group G8 move along trajectories respectively indicated by arrows at the lower part of FIG. 10, upon zooming from the wide angle end state (W) to the telephoto end state (T). Accordingly, the distances between the lens groups adjacent to each other are changed, and the photographing magnification is changed (zooming is performed). The second lens group G2 is fixed, and does not move during zooming. Upon focusing from the infinity object to the short distance object, the fifth lens group G5 and the sixth lens group G6 move toward the image surface respectively on trajectories different from each other, as indicated by arrows at the upper part of FIG. 10.

The first lens group G1 consists of: a positive meniscus lens L11 having a convex surface facing the object; and a positive cemented lens that consists of a negative meniscus lens L12 having a convex surface facing the object, and a positive meniscus lens L13 having a convex surface facing the object. The second lens group G2 consists of: a negative meniscus lens L21 having a convex surface facing the object; a positive cemented lens that consists of a negative meniscus lens L22 having a convex surface facing the object, and a positive meniscus lens L23 having a convex surface facing the object; and a biconcave negative lens L24. The third lens group G3 consists of a biconvex positive lens L31. The fourth lens group G4 consists of: a biconvex positive lens L41; and a positive cemented lens that consists of a biconvex positive lens L42, and a biconcave negative lens L43.

The fifth lens group G5 consists of: a positive meniscus lens L51 having a concave surface facing the object; an aperture stop S; and a biconvex positive lens L52. The sixth lens group G6 consists of: a negative cemented lens that consists of a positive meniscus lens L61 having a concave surface facing the object, and a biconcave negative lens L62.

The seventh lens group G7 consists of: a negative meniscus lens L71 having a convex surface facing the object; and a biconvex positive lens L72. The eighth lens group G8 consists of a biconcave negative lens L81. A parallel plate PP is disposed before the image surface I.

Table 4 lists values of data on the zoom optical system according to Fourth Example.

TABLE 4

[General Data]
Zooming ratio = 2.708

| βF1t = 0.28 | βF1w = 0.37 |
| βF2t = 4.03 | βF2w = 7.39 |
| βBF2w = 1.86 | βBrw = 0.25 |
| ΔX1w = 0.32 | ΔX2w = 1.98 |
| fF2 = −40.33 | fAF2w = 300.05 |
| fBF2w = −62.42 | fBrw = 91.39 |
| fAt = 281.46 | |

| | W | M | T |
|---|---|---|---|
| f | 72.01 | 131.83 | 195.00 |
| FNO | 4.10 | 4.10 | 4.10 |
| 2ω | 33.18 | 18.31 | 12.41 |
| Ymax | 21.60 | 21.60 | 21.60 |
| TL | 190.10 | 196.42 | 202.79 |
| BF | 37.81 | 43.31 | 52.83 |

[Lens Data]

| Surface Number | R | D | nd | νd |
|---|---|---|---|---|
| Object Surface | ∞ | | | |
| 1 | 79.0842 | 5.95 | 1.4875 | 70.32 |
| 2 | 264.5438 | 0.10 | | |
| 3 | 76.9959 | 1.00 | 1.6200 | 36.40 |
| 4 | 48.0525 | 8.95 | 1.4970 | 81.64 |
| 5 | 237.0010 | (D5) | | |
| 6 | 212.5326 | 1.00 | 1.9537 | 32.32 |
| 7 | 35.1692 | 2.15 | | |
| 8 | 52.5161 | 1.00 | 1.5935 | 67.00 |
| 9 | 25.5276 | 6.40 | 1.9630 | 24.11 |
| 10 | 56.3526 | 4.91 | | |
| 11 | −81.6868 | 1.00 | 1.7550 | 52.32 |
| 12 | 117.0223 | (D12) | | |
| 13 | 229.9072 | 3.32 | 2.0007 | 25.46 |
| 14 | −149.7696 | (D14) | | |
| 15 | 108.7396 | 4.23 | 1.5186 | 69.89 |
| 16 | −81.0701 | 0.10 | | |
| 17 | 44.1054 | 6.79 | 1.4971 | 81.56 |
| 18 | −43.2444 | 1.00 | 1.9229 | 20.88 |
| 19 | 208.7919 | 6.96 | | |
| 20(S) | ∞ | (D20) | | |
| 21 | −123.9327 | 2.46 | 2.0027 | 19.32 |
| 22 | −59.8965 | 0.10 | | |
| 23 | 76.0756 | 2.78 | 1.4971 | 81.56 |
| 24 | −9120.5459 | (D24) | | |
| 25 | −400.9124 | 3.38 | 1.7847 | 25.64 |
| 26 | −35.1385 | 1.00 | 1.7440 | 44.90 |
| 27 | 31.1285 | (D27) | | |

TABLE 4-continued

| | | | | |
|---|---|---|---|---|
| 28 | 86.5286 | 1.00 | 1.8513 | 40.10 |
| 29 | 46.8866 | 3.27 | | |
| 30 | 51.7194 | 5.85 | 1.6976 | 55.51 |
| 31 | −51.0112 | (D31) | | |
| 32 | −83.2716 | 1.00 | 1.7296 | 54.07 |
| 33 | 200.0000 | (D33) | | |
| 34 | ∞ | 1.60 | 1.5168 | 63.88 |
| 35 | ∞ | 1.00 | | |
| Image Surface | ∞ | | | |

[Lens Group Data]

| Group | First surface | Focal length |
|---|---|---|
| 1 | 1 | 127.643 |
| 2 | 6 | −32.627 |
| 3 | 13 | 91.026 |
| 4 | 15 | 104.204 |
| 5 | 21 | 64.670 |
| 6 | 25 | −40.331 |
| 7 | 28 | 51.908 |
| 8 | 32 | −80.459 |

[Variable Distance Data]

| | Infinity | | | Very short distance | | |
|---|---|---|---|---|---|---|
| | W | M | T | W | M | T |
| F | 72.100 | 105.000 | 194.000 | 66.728 | 93.257 | 133.735 |
| D5 | 2.000 | 22.798 | 35.000 | 2.000 | 22.798 | 35.000 |
| D12 | 22.209 | 6.752 | 2.000 | 22.209 | 6.752 | 2.000 |
| D14 | 19.979 | 9.878 | 2.100 | 19.979 | 9.878 | 2.100 |
| D20 | 8.931 | 3.262 | 3.460 | 9.340 | 4.223 | 4.748 |
| D24 | 2.155 | 10.230 | 12.617 | 3.818 | 15.216 | 21.949 |
| D27 | 4.073 | 11.769 | 16.961 | 2.000 | 5.820 | 6.341 |
| D31 | 17.106 | 11.180 | 2.000 | 17.106 | 11.181 | 2.000 |
| D33 | 35.348 | 41.260 | 50.363 | 35.442 | 41.365 | 50.363 |

Figure 11A:
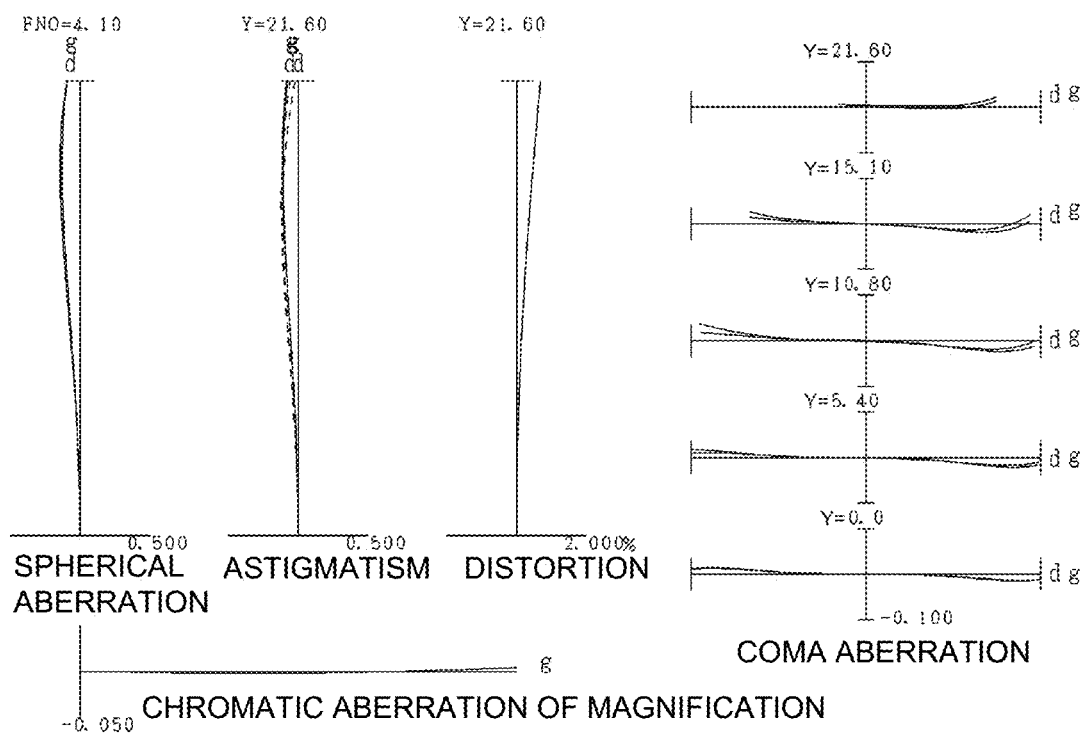
FIGS. 11A and 11B are graphs respectively showing various aberrations of the zoom optical system according to Fourth Example upon focusing on infinity in a wide-angle end state and a telephoto end state.
Figure 11B:
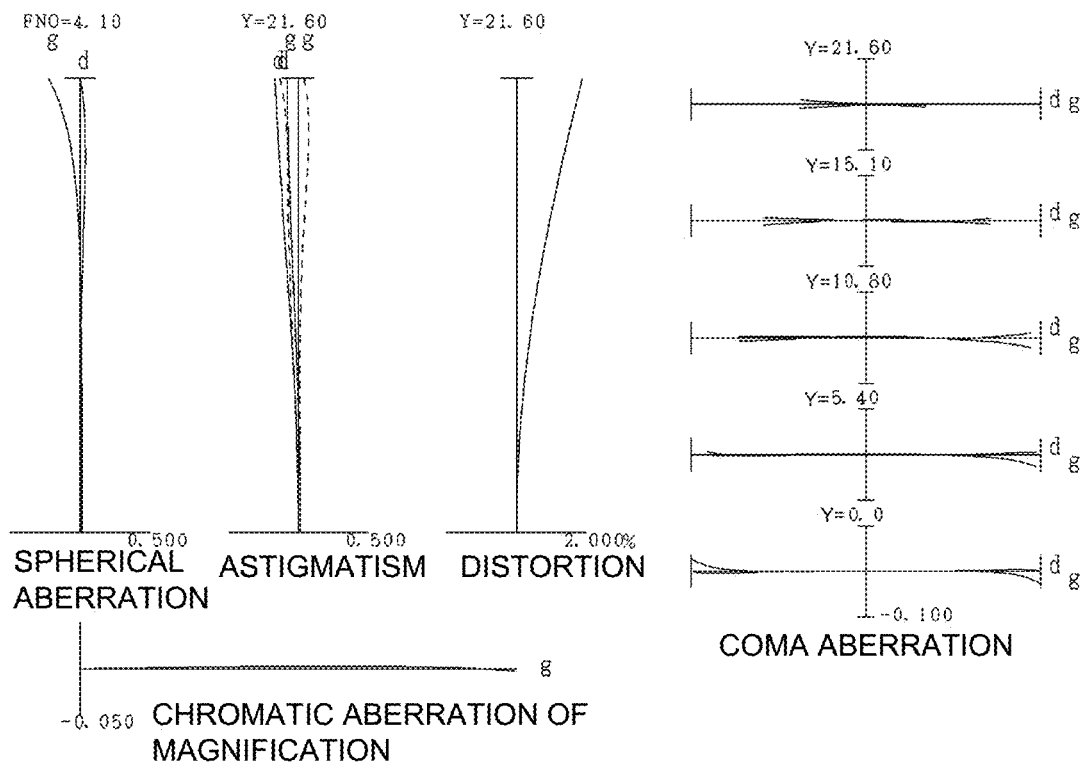
Figure 12A:
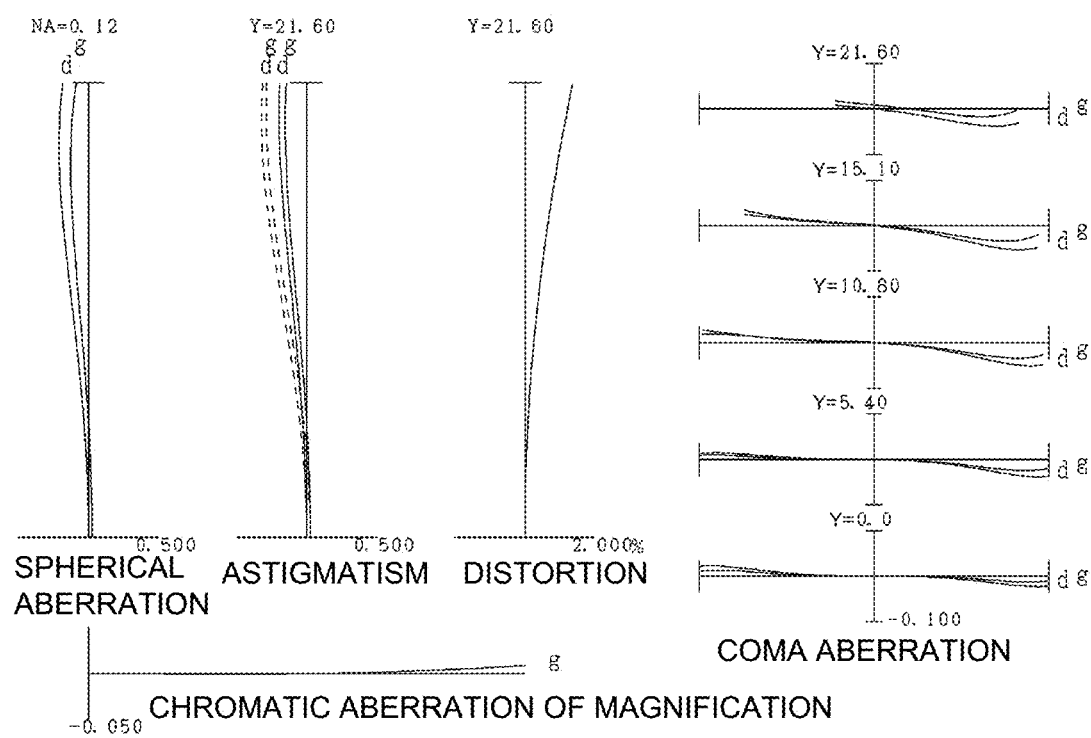
FIGS. 12A and 12B are graphs respectively showing various aberrations of the zoom optical system according to Fourth Example upon focusing on a short distance object in the wide-angle end state and the telephoto end state.
Figure 12B:
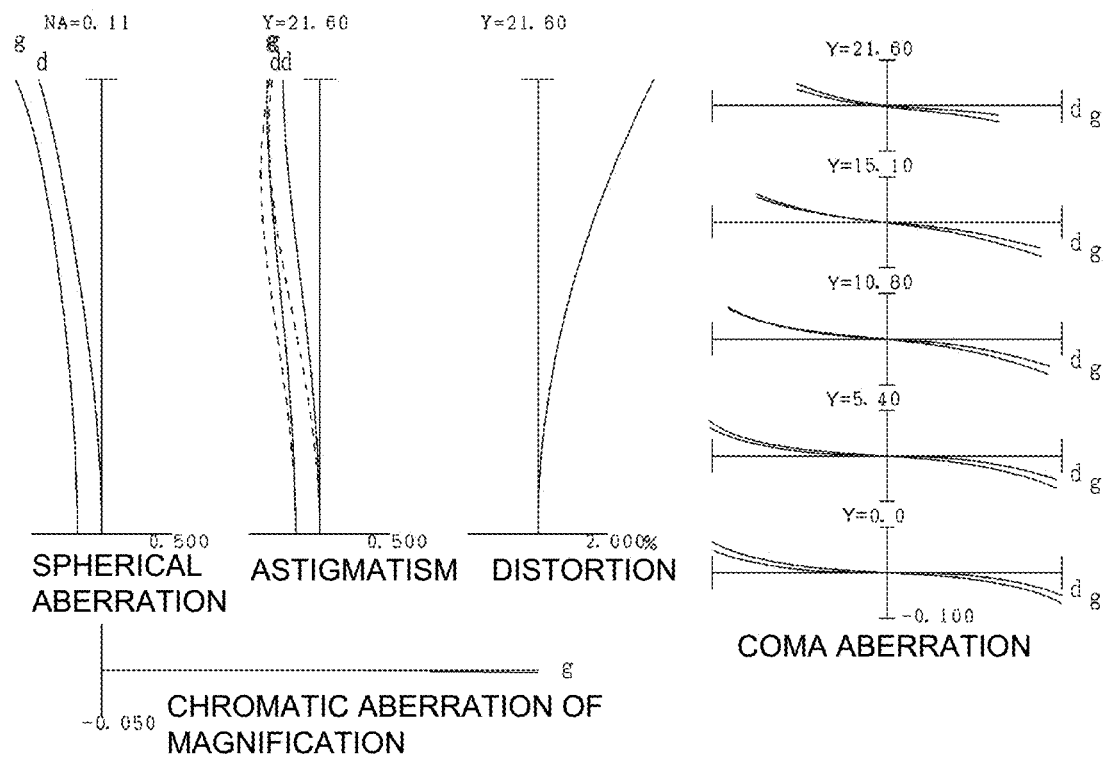

FIG. 11A shows various aberration graphs of the zoom optical system according to Fourth Example upon focusing on infinity in the wide angle end state. FIG. 11B shows various aberration graphs of the zoom optical system according to Fourth Example upon focusing on infinity in the telephoto end state. FIG. 12A shows various aberration graphs of the zoom optical system according to Fourth Example upon focusing on a short distance object in the wide angle end state. FIG. 12B shows various aberration graphs of the zoom optical system according to Fourth Example upon focusing on the short distance object in the telephoto end state. The various aberration graphs show that the zoom optical system according to Fourth Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Fifth Example

Figure 13:
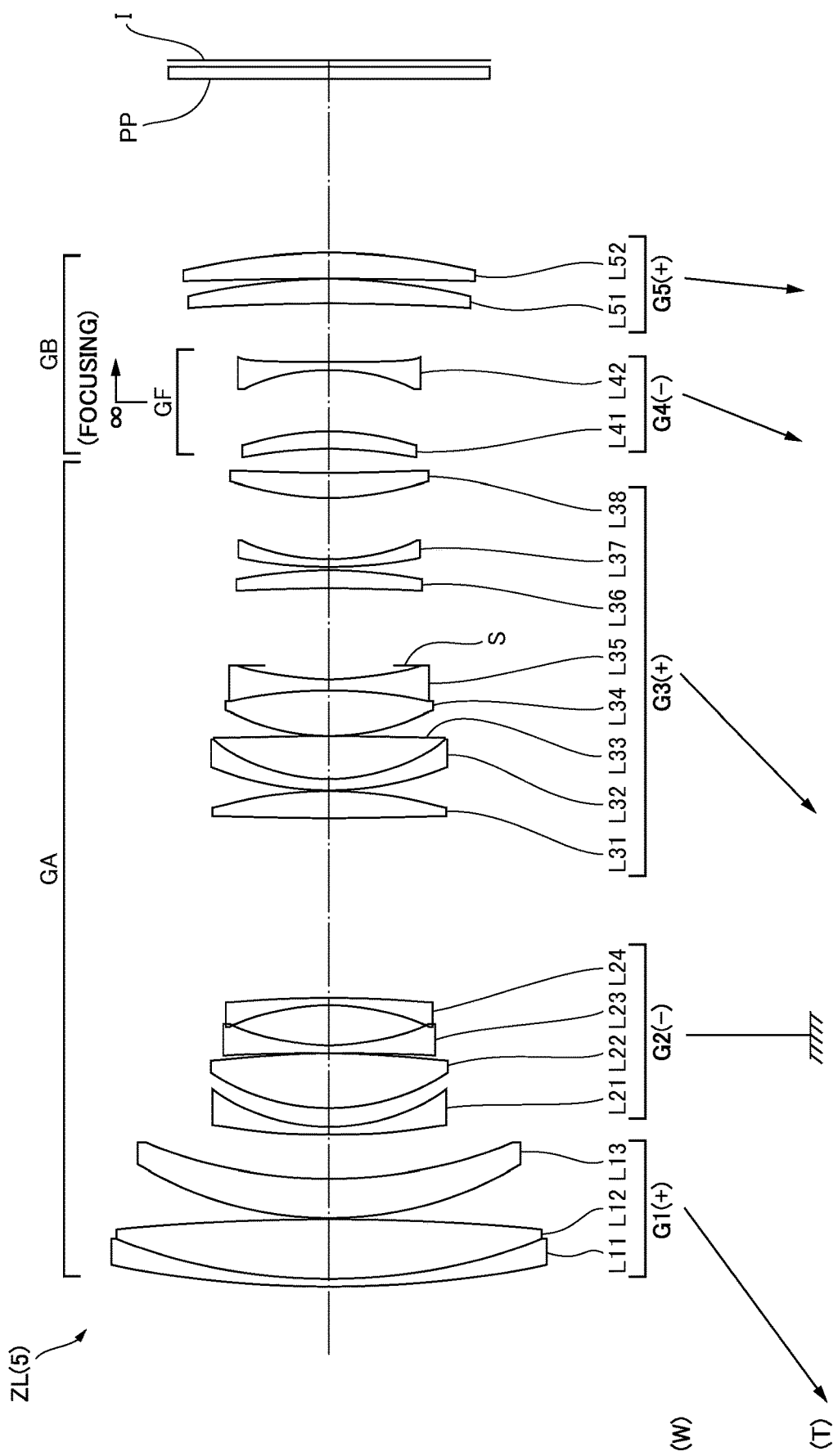
FIG. 13 shows a lens configuration of a zoom optical system according to Fifth Example.

Fifth Example is described with reference to FIGS. 13, 14A and 14B, 15A and 15B, and Table 5. FIG. 13 is a lens configuration diagram of a zoom optical system ZL(5) according to Fifth Example. The zoom optical system ZL(5) consists of, in order from the object: a first lens group G1 having a positive refractive power; a second lens group G2 having a negative refractive power; a third lens group G3 having a positive refractive power; an aperture stop S disposed in the third lens group G3; a fourth lens group G4 having a negative refractive power; and a fifth lens group G5 having a positive refractive power. The image surface I is disposed subsequent to the fifth lens group G5.

In this Example, the fourth lens group G4 functions as the focusing lens group GF. That is, the first lens group G1, the second lens group G2 and the third lens group G3 constitute the front group GA that is fixed with respect to the image surface upon focusing. The fourth lens group G4 and the fifth lens group G5 constitute the rear group GB.

The first lens group G1, the third lens group G3, the fourth lens group G4 and the fifth lens group G5 move along trajectories respectively indicated by arrows at the lower part of FIG. 13, upon zooming from the wide angle end state (W) to the telephoto end state (T). Accordingly, the distances between the lens groups adjacent to each other are changed, and the photographing magnification is changed (zooming is performed). The second lens group G2 is fixed, and does not move during zooming. Upon focusing from the infinity object to the short distance object, the fourth lens group G4 moves toward the image surface as indicated by an arrow at the upper part of FIG. 13.

The first lens group G1 consists of: a cemented lens that consists of a negative meniscus lens L11 having a convex surface facing the object, and a biconvex positive lens L12; and a positive meniscus lens L13 having a convex surface facing the object. The second lens group G2 consists of: a negative meniscus lens L21 having a convex surface facing the object; a biconvex positive lens L22; a biconcave negative lens L23; and a negative meniscus lens L24 having a concave surface facing the object. The third lens group G3 consists of: a biconvex positive lens L31; a cemented lens that consists of a negative meniscus lens L31 having a convex surface facing the object, and a biconvex positive lens L33; a cemented lens that consists of a biconvex positive lens L34, and a biconcave negative lens L35; an aperture stop S; a positive meniscus lens L36 having a concave surface facing the object; a negative meniscus lens L37 having a convex surface facing the object; and a positive meniscus lens L38 having a convex surface facing the object.

The fourth lens group G4 consists of: a positive meniscus lens L41 having a concave surface facing the object; and a biconcave negative lens L42. The fifth lens group G5 consists of: a positive meniscus lens L51 having a concave surface facing the object; and a positive meniscus lens L52 having a concave surface facing the object. A parallel plate PP is disposed before the image surface I.

Table 5 lists values of data on the zoom optical system according to Fifth Example.

TABLE 5

[General Data]
Zooming ratio = 2.701

| βF2w = 2.19 | |
|---|---|
| βBF2w = 1.45 | βBrw = 0.66 |
| fF2 = −42.46 | fAF2w = 109.06 |
| fBF2w = −126.62 | fBrw = 78.93 |

| | W | M | T |
|---|---|---|---|
| f | 72.10 | 111.59 | 194.00 |
| FNO | 4.10 | 4.10 | 4.11 |
| 2ω | 33.07 | 21.21 | 12.29 |
| Ymax | 21.60 | 21.60 | 21.60 |
| TL | 170.62 | 194.98 | 204.57 |
| BF | 26.33 | 26.34 | 26.41 |

TABLE 5-continued

[Lens Data]

| Surface Number | R | D | nd | vd |
|---|---|---|---|---|
| Object Surface | ∞ | | | |
| 1 | 153.0418 | 1.00 | 1.7950 | 28.69 |
| 2 | 81.289 | 8.42 | 1.5932 | 67.90 |
| 3 | −319.7357 | 0.10 | | |
| 4 | 51.972 | 5.48 | 1.4970 | 81.61 |
| 5 | 68.9954 | (D5) | | |
| 6 | 102.4213 | 1.00 | 1.7570 | 47.82 |
| 7 | 28.2387 | 2.64 | | |
| 8 | 30.1162 | 7.69 | 1.8052 | 25.46 |
| 9 | −120.6517 | 0.10 | | |
| 10 | −275.1702 | 1.00 | 1.7725 | 49.62 |
| 11 | 35.0678 | 5.57 | | |
| 12 | −34.6195 | 1.00 | 1.8588 | 30.00 |
| 13 | −166.953 | (D13) | | |
| 14 | 432.4033 | 3.78 | 1.6385 | 55.38 |
| 15 | −58.0996 | 0.10 | | |
| 16 | 43.8656 | 1.56 | 1.8010 | 34.92 |
| 17 | 26.9447 | 5.92 | 1.6400 | 60.19 |
| 18 | −1604.8469 | 0.10 | | |
| 19 | 30.6714 | 6.26 | 1.4875 | 70.32 |
| 20 | −65.1694 | 1.60 | 1.8061 | 40.97 |
| 21 | 45.6195 | 2.00 | | |
| 22(S) | ∞ | 10.68 | | |
| 23 | −198.2201 | 2.52 | 1.6850 | 49.22 |
| 24 | −61.4817 | 0.43 | | |
| 25 | 63.3773 | 1.00 | 1.9020 | 25.10 |
| 26 | 29.9748 | 8.62 | | |
| 27 | 42.2467 | 3.43 | 1.8919 | 37.13 |
| 28 | 313.3184 | (D28) | | |
| 29 | −59.9421 | 2.43 | 1.8467 | 23.78 |
| 30 | −37.5377 | 8.57 | | |
| 31 | −28.2576 | 1.00 | 1.8061 | 40.93 |
| 32 | 139.4046 | (D32) | | |
| 33 | −295.2748 | 3.37 | 1.6700 | 51.72 |
| 34 | −81.284 | 0.10 | | |
| 35 | −500.48 | 3.53 | 1.7283 | 28.41 |
| 36 | −89.2134 | (D36) | | |
| 37 | ∞ | 1.60 | 1.5168 | 63.88 |
| 38 | ∞ | 1.00 | | |
| Image Surface | ∞ | | | |

[Lens Group Data]

| Group | First surface | Focal length |
|---|---|---|
| 1 | 1 | 138.365 |
| 2 | 6 | −33.239 |
| 3 | 14 | 41.795 |
| 4 | 29 | −42.455 |
| 5 | 33 | 78.928 |

[Variable Distance Data]

| | Infinity | | | Very short distance | | |
|---|---|---|---|---|---|---|
| | W | M | T | W | M | T |
| F | 72.100 | 111.593 | 194.000 | 67.313 | 97.936 | 129.512 |
| D5 | 6.128 | 30.481 | 40.000 | 6.128 | 30.481 | 40.000 |
| D13 | 25.026 | 19.401 | 2.100 | 25.025 | 19.401 | 2.100 |
| D28 | 3.317 | 1.297 | 12.305 | 6.664 | 8.143 | 32.524 |
| D32 | 8.282 | 15.926 | 22.219 | 4.934 | 9.079 | 2.000 |
| D36 | 24.274 | 24.285 | 24.357 | 24.275 | 24.286 | 24.357 |

Figure 14A:
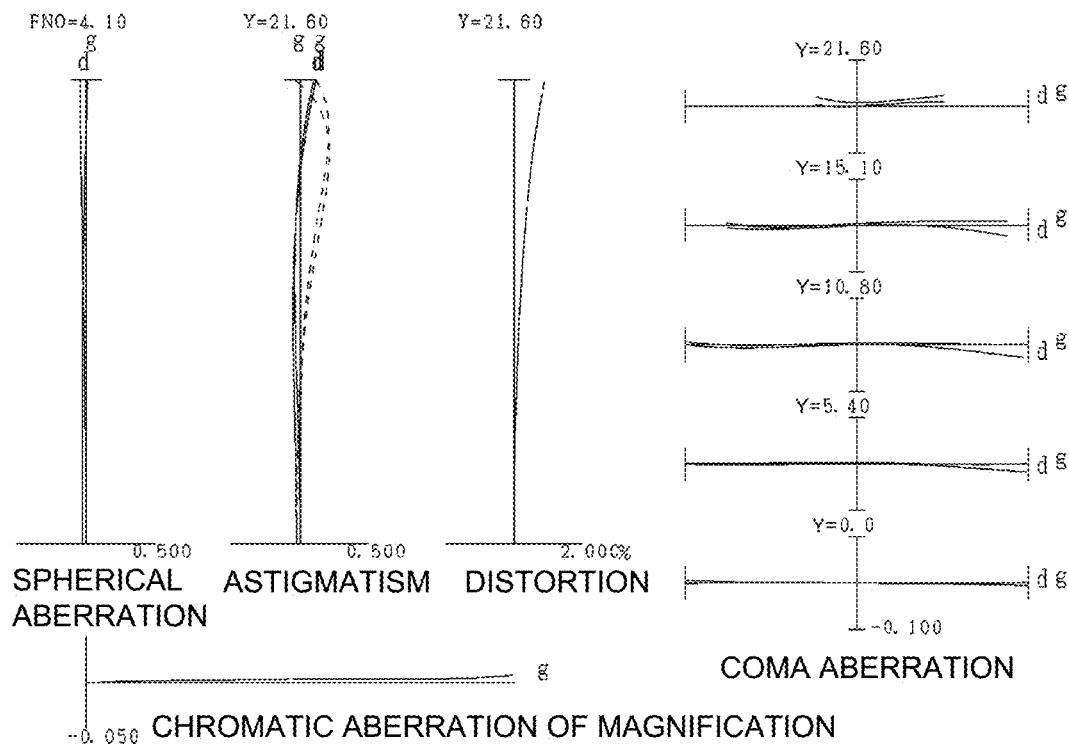
FIGS. 14A and 14B are graphs respectively showing various aberrations of the zoom optical system according to Fifth Example upon focusing on infinity in a wide-angle end state and a telephoto end state.
Figure 14B:
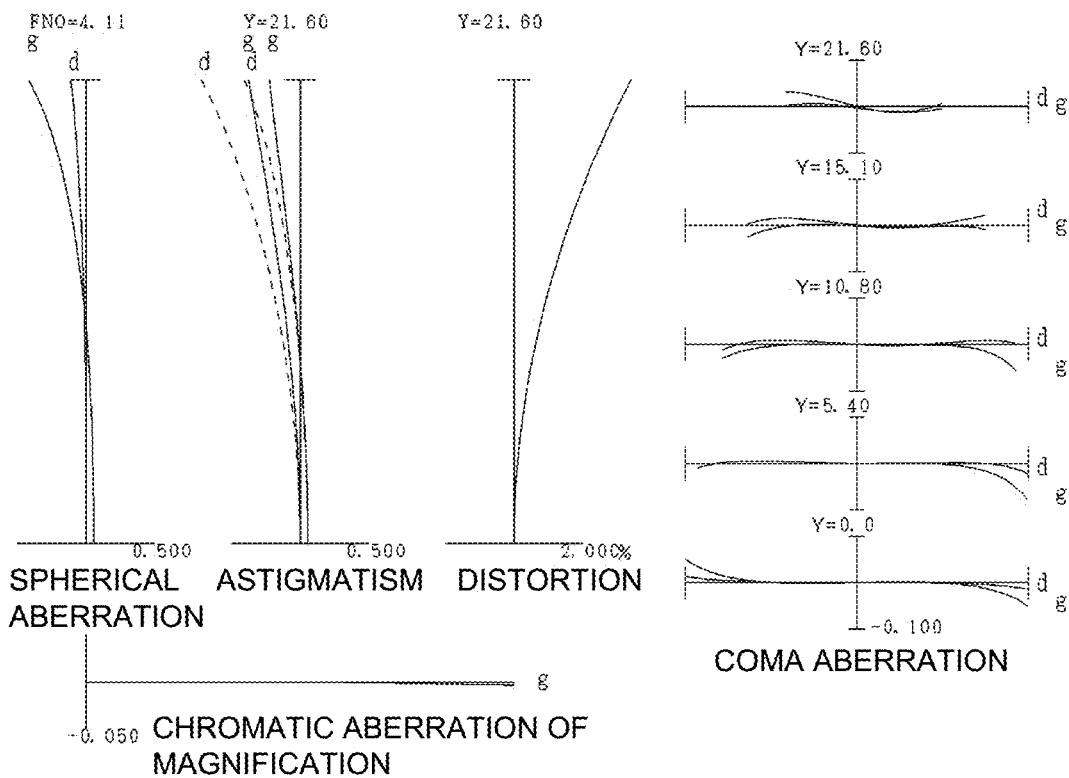
Figure 15A:
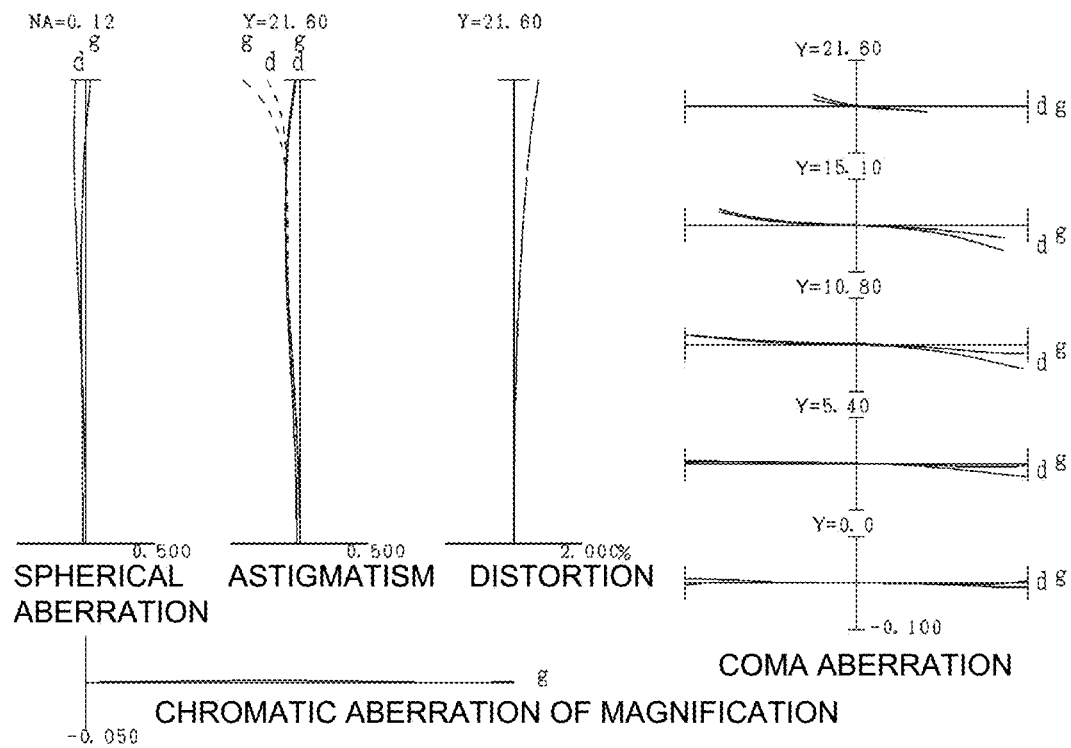
FIGS. 15A and 15B are graphs respectively showing various aberrations of the zoom optical system according to Fifth Example upon focusing on a short distance object in the wide-angle end state and the telephoto end state.
Figure 15B:
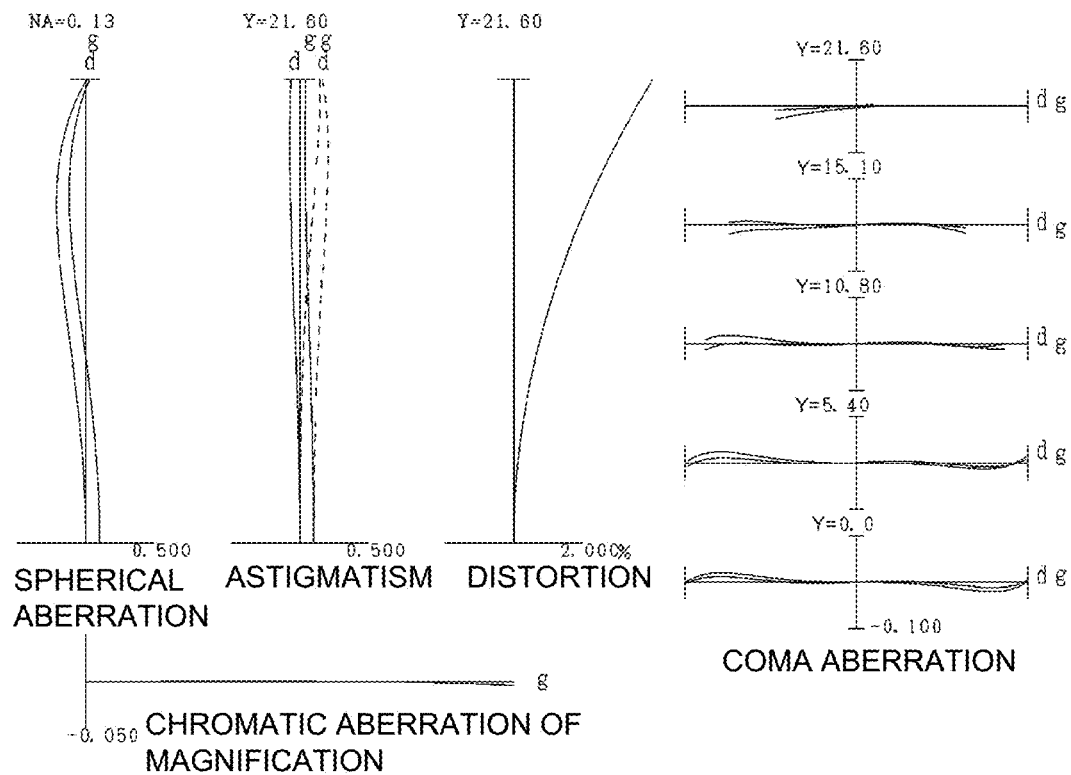

FIG. 14A shows various aberration graphs of the zoom optical system according to Fifth Example upon focusing on infinity in the wide angle end state. FIG. 14B shows various aberration graphs of the zoom optical system according to Fifth Example upon focusing on infinity in the telephoto end state. FIG. 15A shows various aberration graphs of the zoom optical system according to Fifth Example upon focusing on a short distance object in the wide angle end state. FIG. 15B shows various aberration graphs of the zoom optical system according to Fifth Example upon focusing on the short distance object in the telephoto end state. The various aberration graphs show that the zoom optical system according to Fifth Example favorably corrects various aberrations, and exerts an excellent imaging performance, in the entire range from focusing on infinity to focusing on the short distance object. Accordingly, even in the case of focusing on the short distance object, the variation in angle of view upon focusing can be reduced while securing a favorable optical performance.

Next, the table of [Conditional Expression Corresponding Value] is shown below. This table collectively indicates values corresponding to the conditional expressions (1) to (19) with respect to all Examples (First to Fifth Examples).

| | |
|---|---|
| $0.25 < \beta F1t/\beta F1w < 2.00$ | Conditional expression (1) |
| $0.25 < \beta F2w/\beta F2t < 2.00$ | Conditional expression (2) |
| $0.01 < \beta F1w/\beta F2w < 0.25$ | Conditional expression (3) |
| $0.10 < \Delta X1w/\Delta X2w < 0.75$ | Conditional expression (4) |
| $0.001 < 1/fAt < 0.020$ | Conditional expression (5) |
| $0.001 < 1/fAF2w < 0.015$ | Conditional expression (6) |
| $0.35 < fF2/fBF2w < 0.75$ | Conditional expression (7) |
| $-2.00 < fBF2w/fBrw < -0.15$ | Conditional expression (8) |
| $0.10 < \beta BF2w/\beta F2w < 0.80$ | Conditional expression (9) |
| $0.05 < \beta Brw/\beta BF2w < 0.50$ | Conditional expression (10) |
| $0.35 < fF2/fBF2w < 0.75$ | Conditional expression (11) |
| $-2.00 < fBF2w/fBrw < -0.15$ | Conditional expression (12) |
| $0.10 < \beta BF2w/\beta F2w < 0.80$ | Conditional expression (13) |
| $0.05 < \beta Brw/\beta BF2w < 0.50$ | Conditional expression (14) |
| $0.001 < 1/fAF2w < 0.015$ | Conditional expression (15) |
| $0.15 < (ftinf - ftmod)/ftinf < 0.40$ | Conditional expression (16) |
| $0.35 < STw/TLw < 0.65$ | Conditional expression (17) |
| $0.04 < Bft/TLt < 0.35$ | Conditional expression (18) |
| $0.25 < Bfw/fw < 0.70$ | Conditional expression (19) |

[Conditional Expression Corresponding Value]

| Conditional Expression | 1st Example | 2nd Example | 3rd Example | 4th Example | 5th Example |
|---|---|---|---|---|---|
| (1) | 0.944 | 0.862 | 1.152 | 0.754 | — |
| (2) | 0.826 | 0.896 | 1.290 | 1.832 | 0.868 |
| (3) | 0.163 | 0.124 | 0.089 | 0.050 | — |
| (4) | 0.596 | 0.587 | 0.435 | 0.160 | — |
| (5) | 0.009 | 0.008 | 0.006 | 0.004 | — |
| (6) | 0.004 | 0.003 | 0.005 | 0.003 | — |
| (7) | 0.568 | 0.436 | 0.679 | 0.646 | — |
| (8) | −0.626 | −1.022 | −0.597 | −0.683 | — |
| (9) | 0.677 | 0.562 | 0.413 | 0.251 | — |
| (10) | 0.391 | 0.331 | 0.233 | 0.135 | — |
| (11) | 0.568 | 0.436 | 0.679 | 0.646 | 0.335 |
| (12) | −0.626 | −1.022 | −0.597 | −0.683 | −1.604 |

-continued

[Conditional Expression Corresponding Value]

| Conditional Expression | 1st Example | 2nd Example | 3rd Example | 4th Example | 5th Example |
|---|---|---|---|---|---|
| (13) | 0.677 | 0.562 | 0.413 | 0.251 | 0.661 |
| (14) | 0.391 | 0.331 | 0.233 | 0.135 | 0.457 |
| (15) | 0.004 | 0.003 | 0.005 | 0.003 | 0.009 |
| (16) | 0.279 | 0.311 | 0.291 | 0.274 | 0.332 |
| (17) | 0.526 | 0.522 | 0.524 | 0.479 | 0.493 |
| (18) | 0.251 | 0.181 | 0.247 | 0.260 | 0.129 |
| (19) | 0.524 | 0.516 | 0.523 | 0.525 | 0.365 |

According to each Example described above, a zoom optical system having a small variation in angle of view upon focusing can be achieved.

Examples described above show specific examples of the invention of the present application. The invention of the present application is not limited to these Examples.

The following content can be adopted in a range without impairing the optical performance of the zoom optical system of this embodiment.

As Examples of the zoom optical systems of the embodiments, those having the five-group structure, the six-group structure, and the eight-group structure are described. However, the present application is not limited thereto. Zoom optical systems having other group configurations (e.g., a seven- or nine group structure, etc.) may be configured. Specifically, a configuration may be adopted where a lens or a lens group is added to a place closest to the object and a place closest to the image surface in the zoom optical system according to this embodiment. Note that the lens group indicates a portion that includes at least one lens separated by air distances that change during zooming.

A focusing lens group may be adopted that moves a single or multiple lens groups, or a partial lens group in the optical axis direction and achieves focusing from the infinity object to the short distance object. The focusing lens group is also applicable to autofocusing, and is suitable also for motor drive for autofocusing (using an ultrasonic motor or the like).

A vibration-proof lens group may be adopted where a lens group or a partial lens group is moved so as to have a component in a direction perpendicular to the optical axis, or rotationally moved (swung) in a direction in a plane containing the optical axis, and the image blur caused by a camera shake is thus corrected.

The lens surface may be made of a spherical surface or a planar surface, or an aspherical surface. A case where the lens surface is a spherical surface or a planar surface is preferable because lens processing, and assembling and adjustment are facilitated, and the optical performance degradation due to errors caused by processing and assembling and adjustment can be prevented. It is also preferable because the degradation in representation performance even with the image surface being misaligned is small.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

Preferably, the aperture stop is disposed in the third lens group or the fourth lens group. However, the member as the aperture stop is not necessarily provided, a frame of a lens may replace the role.

An antireflection film having a high transmissivity in a wide wavelength region may be applied onto each lens surface in order to reduce flares and ghosts and achieve optical performances having a high contrast.

EXPLANATION OF NUMERALS AND CHARACTERS

G1 First lens group G2 Second lens group
G3 Third lens group G4 Fourth lens group
G5 Fifth lens group G6 Sixth lens group
G7 Seventh lens group G8 Eighth lens group
I Image surface S Aperture stop

The invention claimed is:

1. A zoom optical system essentially consisting of, in order from an object along an optical axis: a front group; and a rear group, wherein
the front group comprises, in order from the object along the optical axis, a first lens group having a positive refractive power, a second lens group having a negative refractive power, and a third lens group having a positive refractive power,
the rear group includes:
a first focusing lens group having a positive refractive power disposed closest to the object in the rear group;
a second focusing lens group having a negative refractive power disposed closer to an image surface than the first focusing lens group; and
a lens group having a positive refractive power disposed closer to the image surface than the second focusing lens group,
upon zooming, a distance between lens groups adjacent to each other changes,
upon zooming, a lens group disposed closest to the image surface moves,
upon focusing from an infinity object to a short distance object, the first focusing lens group and the second focusing lens group move along the optical axis, respectively on trajectories different from each other, and
the following conditional expressions are satisfied:

$$0.25 < \beta F1t/\beta F1w < 2.00$$

$$0.25 < \beta F2w/\beta F2t < 2.00$$

where βF1t: a magnification of the first focusing lens group upon focusing on infinity in a telephoto end state,
βF1w: a magnification of the first focusing lens group upon focusing on infinity in a wide angle end state,
βF2t: a magnification of the second focusing lens group upon focusing on infinity in the telephoto end state, and
βF2w: a magnification of the second focusing lens group upon focusing on infinity in the wide angle end state.

2. The zoom optical system according to claim 1, wherein the first focusing lens group moves toward the image surface upon focusing from the infinity object to the short distance object.

3. The zoom optical system according to claim 1, wherein the second focusing lens group moves toward the image surface upon focusing from the infinity object to the short distance object.

4. The zoom optical system according to claim 1, wherein the following conditional expression is satisfied:

$$0.01 < \beta F1w/\beta F2w < 0.25.$$

5. The zoom optical system according to claim 1, wherein the second focusing lens group includes, in order from the object along the optical axis: one positive lens and one negative lens.

6. The zoom optical system according to claim 1, wherein the following conditional expression is satisfied:

$$0.35 < fF2/fBF2w < 0.75$$

where fF2: a focal length of the second focusing lens group, and
fBF2w: a combined focal length of lens groups from the second focusing lens group to a lens group closest to the image surface in the wide angle end state.

7. The zoom optical system according to claim 1, wherein the following conditional expression is satisfied:

$$-2.00 < fBF2w/fBrw < -0.15$$

where fBF2w: a combined focal length of lens groups from the second focusing lens group to a lens group closest to the image surface in the wide angle end state, and
fBrw: a combined focal length of lens groups disposed closer to the image surface than the second focusing lens group in the wide angle end state.

8. The zoom optical system according to claim 1, wherein the following conditional expression is satisfied:

$$0.10 < \beta BF2w/\beta F2w < 0.80$$

where βBF2w: a combined magnification of lens groups from the second focusing lens group to a lens group closest to the image surface in the wide angle end state.

9. The zoom optical system according to claim 1, wherein the following conditional expression is satisfied:

$$0.05 < \beta Brw/\beta BF2w < 0.50 \qquad \text{Conditional expression (10)}$$

where βBrw: a combined magnification of lens groups disposed closer to the image surface than the second focusing lens group in the wide angle end state, and
βBF2w: a combined magnification of lens groups from the second focusing lens group to a lens group closest to the image surface in the wide angle end state.

10. The zoom optical system according to claim 1, further comprising an aperture stop in the front group, wherein the following conditional expression is satisfied:

$$0.35 < STw/TLw < 0.65$$

where STw: a distance on the optical axis from the aperture stop to the image surface in the wide angle end state, and
TLw: an entire length of the zoom optical system in the wide angle end state.

11. The zoom optical system according to claim 1, wherein the following conditional expression is satisfied:

$$0.04 < Bft/TLt < 0.35$$

where Bft: a back focus of the zoom optical system in the telephoto end state, and
TLt: an entire length of the zoom optical system in the telephoto end state.

12. The zoom optical system according to claim 1, wherein the following conditional expression is satisfied:

$$0.25 < Bfw/fw < 0.70$$

where Bfw: a back focus of the zoom optical system in the wide angle end state, and
fw: a focal length of the zoom optical system in the wide angle end state.

13. An optical apparatus comprising the zoom optical system according to claim 1.

14. A zoom optical system essentially consisting of, in order from an object along an optical axis: a front group; and a rear group, wherein
the rear group includes one or two focusing lens groups which are moved along the optical axis upon focusing, and
the focusing lens group that is disposed closer to an image surface out of the one or two focusing lens groups has a negative refractive power,
upon zooming, a distance between lens groups adjacent to each other changes, and
the following conditional expression is satisfied:

$$0.35 < fF2/fBF2w < 0.75$$

where fF2: a focal length of the focusing lens group; in a case where the rear group includes a plurality of focusing lens groups including the focusing lens group, a focal length of a focusing lens group disposed closest to the image surface among the plurality of focusing lens groups, and
fBF2w: a combined focal length of lens groups from the focusing lens group to the lens group closest to the image surface in the wide angle end state; in the case where the rear group includes the plurality of focusing lens groups including the focusing lens group, a combined focal length of lens groups that are from the focusing lens group disposed closest to the image surface among the plurality of focusing lens groups to a lens group closest to the image surface.

15. The zoom optical system according to claim 14, wherein
the following conditional expression is satisfied:

$$-2.00 < fBF2w/fBrw < -0.15$$

where fBrw: a combined focal length of lens groups disposed closer to the image surface than the focusing lens group in the wide angle end state; in the case where the rear group includes the plurality of focusing lens groups including the focusing lens group, a combined focal length of lens groups disposed closer to the image surface than the focusing lens group disposed closest to the image surface among the plurality of focusing lens groups.

16. The zoom optical system according to claim 14, wherein
the following conditional expression is satisfied:

$$0.10 < \beta BF2w/\beta F2w < 0.80$$

where βBF2w: a combined magnification of the lens groups from the focusing lens group to the lens group closest to the image surface in the wide angle end state; in the case where the rear group includes the plurality of focusing lens groups including the focusing lens group, a combined magnification of the lens groups that are from the focusing lens group disposed closest to the image surface among the plurality of focusing lens groups to the lens group closest to the image surface, and
βF2w: a magnification of the focusing lens group in the wide angle end state; in the case where the rear group includes the plurality of focusing lens groups including the focusing lens group, a magnification of the focusing lens group disposed closest to the image surface among the plurality of focusing lens groups.

17. The zoom optical system according to claim 14, wherein
the following conditional expression is satisfied:

$$0.05 < \beta Brw/\beta BF2w < 0.50$$

where βBrw: a combined magnification of lens groups disposed closer to the image surface than the focusing lens group in the wide angle end state; in a case where the rear group includes the plurality of focusing lens groups including the focusing lens group, a combined magnification of lens groups disposed closer to the image surface than the focusing lens group disposed closest to the image surface among the plurality of focusing lens groups, and βBF2w: a combined magnification of lens groups from the focusing lens group to the lens group closest to the image surface in the wide angle end state; in the case where the rear group includes the plurality of focusing lens groups including the focusing lens group, a combined magnification of lens groups that are from the focusing lens group disposed closest to the image surface among the plurality of focusing lens groups to the lens group closest to the image surface.

18. The zoom optical system according to claim 14, wherein:
the front group comprises, in order from the object along the optical axis, a first lens group having a positive refractive power, a second lens group having a negative refractive power, and a third lens group having a positive refractive power,
upon zooming, at least one of the first to the third lens groups is fixed with respect to the image surface, and
a lens group having a positive refractive power and a lens group having a negative refractive power are disposed on an image side of the focusing lens group that is disposed closer to the image surface out of the one or two focusing lens groups.

19. The zoom optical system according to claim 14, wherein:
the front group comprises, in order from the object along the optical axis, a first lens group having a positive refractive power, a second lens group having a negative refractive power, and a third lens group having a positive refractive power, and
the third lens group has three lens components.

20. The zoom optical system according to claim 14, wherein:
a lens group disposed closest to the object in the front group is moved along the optical axis upon zooming,
a lens group having a positive refractive power is disposed on an image side of the focusing lens group that is disposed closer to the image surface out of the one or two focusing lens groups, and
all the lens groups in the rear group are moved along the optical axis upon zooming.

21. A method for manufacturing a zoom optical system essentially consisting of, in order from an object along an optical axis: a front group; and a rear group, wherein
the method comprises either the following step A or the following step B,
the step A comprising disposing the front group and the rear group in a lens barrel so that:

the front group comprises, in order from the object along the optical axis, a first lens group having a positive refractive power, a second lens group having a negative refractive power, and a third lens group having a positive refractive power,
the rear group includes:
a first focusing lens group having a positive refractive power disposed closest to the object in the rear group;
a second focusing lens group having a negative refractive power disposed closer to an image surface than the first focusing lens group; and
a lens group having a positive refractive power disposed closer to the image surface than the second focusing lens group,
upon zooming, a distance between lens groups adjacent to each other changes,
upon zooming, a lens group disposed closest to the image surface moves,
upon focusing from an infinity object to a short distance object, the first focusing lens group and the second focusing lens group move along the optical axis, respectively on trajectories different from each other, and
the following conditional expressions are satisfied:

$$0.25 < \beta F1t/\beta F1w < 2.00$$

$$0.25 < \beta F2w/\beta F2t < 2.00$$

where βF1t: a magnification of the first focusing lens group upon focusing on infinity in a telephoto end state,
βF1w: a magnification of the first focusing lens group upon focusing on infinity in a wide angle end state,
βF2t: a magnification of the second focusing lens group upon focusing on infinity in the telephoto end state, and
βF2w: a magnification of the second focusing lens group upon focusing on infinity in the wide angle end state,
the step B comprising disposing the front group and the rear group in a lens barrel so that:
the rear group includes one or two focusing lens groups which are moved along the optical axis upon focusing, and
the focusing lens group that is disposed closer to an image surface out of the one or two focusing lens groups has a negative refractive power,
upon zooming, a distance between lens groups adjacent to each other changes, and
the following conditional expression is satisfied:

$$0.35 < fF2/fBF2w < 0.75 \qquad \text{Conditional expression (7)}$$

where fF2: a focal length of the focusing lens group; in a case where the rear group includes a plurality of focusing lens groups including the focusing lens group, a focal length of a focusing lens group disposed closest to the image surface among the plurality of focusing lens groups, and
fBF2w: a combined focal length of lens groups from the focusing lens group to the lens group closest to the image surface in the wide angle end state; in the case where the rear group includes the plurality of focusing lens groups including the focusing lens group, a combined focal length of lens groups that are from the focusing lens group disposed closest to the image surface among the plurality of focusing lens groups to a lens group closest to the image surface.

\* \* \* \* \*